INVENTORS
WILLIAM WALLAR BUNTING, JR.
FRANKLIN JAMES EVANS
DAVID ELLIS HOOK
BY
ATTORNEY

INVENTORS
WILLIAM WALLAR BUNTING, JR.
FRANKLIN JAMES EVANS
DAVID ELLIS HOOK

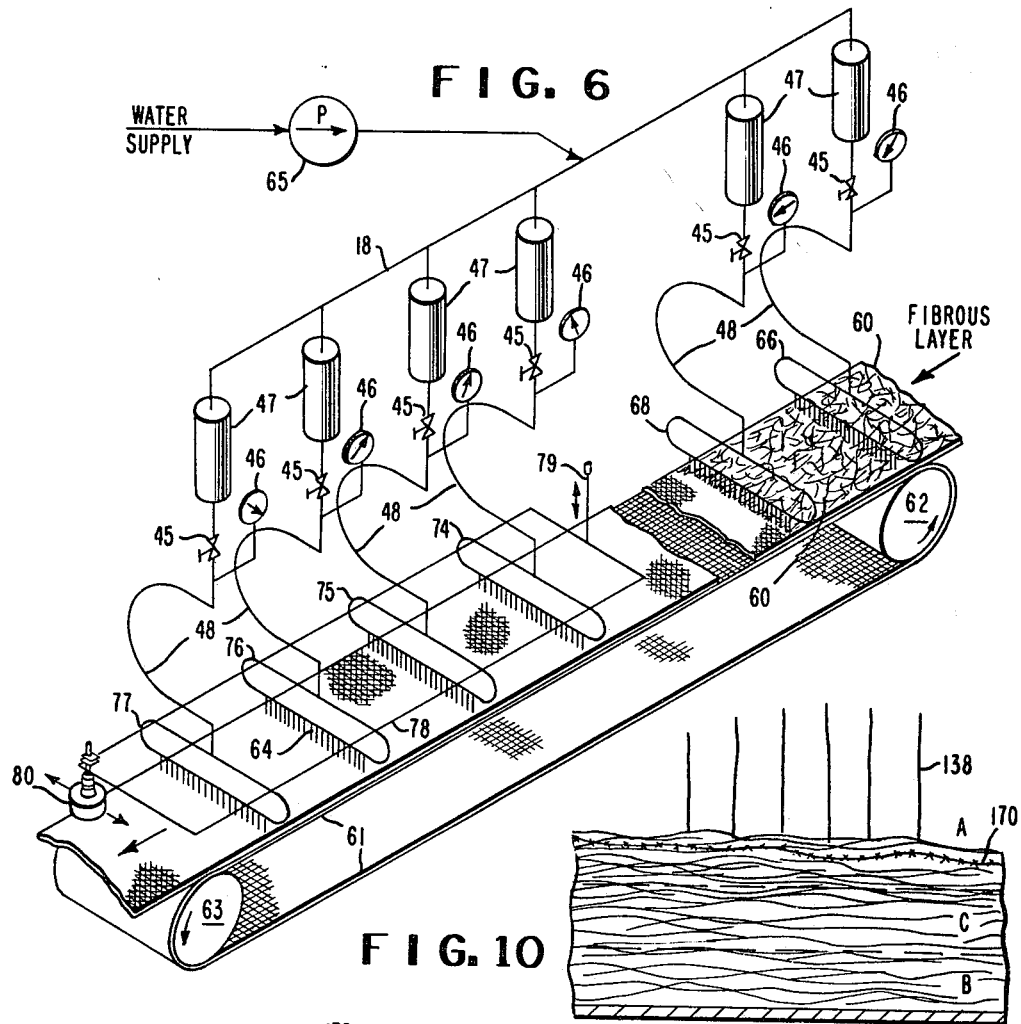
FIG. 6
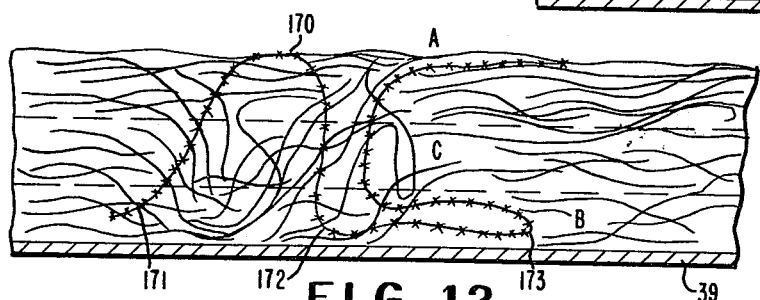
FIG. 10
FIG. 11
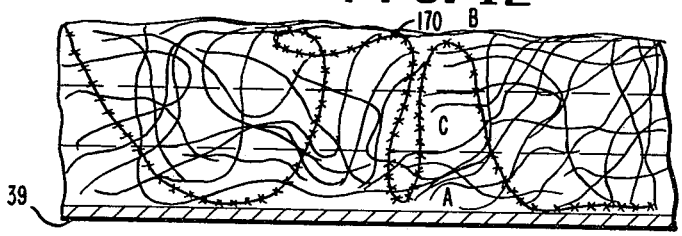
FIG. 12
INVENTORS
WILLIAM WALLAR BUNTING, JR.
FRANKLIN JAMES EVANS
DAVID ELLIS HOOK
BY
ATTORNEY Feb. 3, 1970   W. W. BUNTING, JR., ET AL   3,493,462
NONPATTERNED, NONWOVEN FABRIC
Filed March 11, 1968   7 Sheets-Sheet 4

FIG. 7

INVENTORS
WILLIAM WALLER BUNTING, JR.
FRANKLIN JAMES EVANS
DAVID ELLIS HOOK
BY
*Norris E. Rockman*
ATTORNEY

INVENTORS
WILLIAM WALLAR BUNTING, JR.
FRANKLIN JAMES EVANS
DAVID ELLIS HOOK

BY *Norris E. Rockman*

ATTORNEY

FIG. 13
FIG. 14
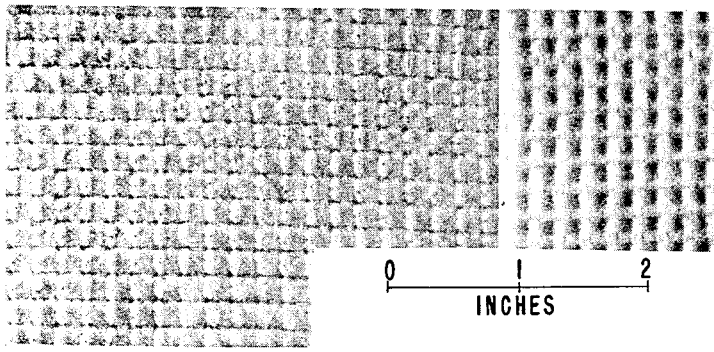
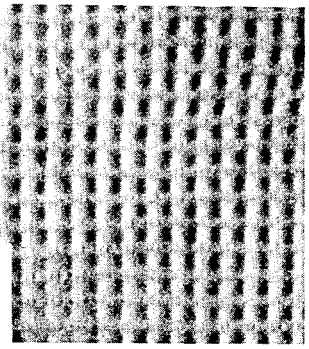
0 1 2
INCHES
FIG. 15
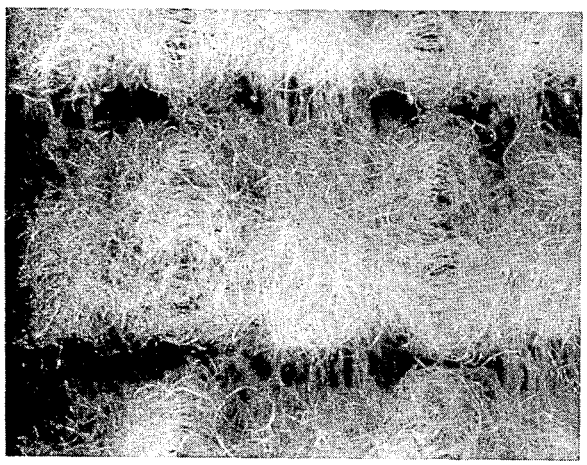
FIG. 16
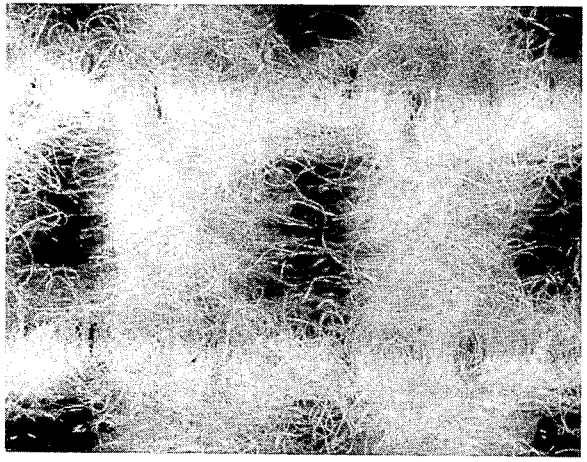

United States Patent Office 3,493,462
Patented Feb. 3, 1970

3,493,462
NONPATTERNED, NONWOVEN FABRIC
William Wallar Bunting, Jr., Franklin James Evans, and
David Ellis Hook, Wilmington, Del., assignors to E. I.
du Pont de Nemours and Company, Wilmington, Del.,
a corporation of Delaware
Continuation-in-part of abandoned application Ser. No.
584,627, Sept. 22, 1966, which is a division of application Ser. No. 208,136, July 6, 1962. This application
Mar. 11, 1968, Ser. No. 712,070
Int. Cl. D04h 3/08; D06c 1/06
U.S. Cl. 161—169                                    2 Claims

ABSTRACT OF THE DISCLOSURE

Processes are disclosed for treating fibrous sheet materials with streams of water or other suitable liquid. Fibrous sheet material on a supporting member is traversed with the streams to entangle the fibers in a manner which imparts strength and stability without the need for binder. The examples illustrate application of the process to a variety of fibrous sheet materials, including treatment of batts of loose staple fibers or continuous filaments, to form coherent, highly stable, strong nonwoven fabrics which are randomly entangled and substantially nonpatterned or which have a repeating pattern of closely spaced lines of fiber entanglement.

CROSS-REFERENCES TO RELATED APPLICATIONS

This is a continuation-in-part of copending application Ser. No. 584,267, filed Sept. 22, 1966, now abandoned as a division of Ser. No. 208,136, filed July 6, 1962, and now abandoned.

BACKGROUND OF THE INVENTION

This invention relates to novel textile products and to a process for their production. More particularly, it relates to nonwoven fabrics obtained by subjecting bulk fibrous materials to the action of liquid streams.

The prior art discloses various processes in which fluids under pressure have been used to treat textile materials. For example, dispersed streams of water, provided by a solid cone spray nozzle supplied with water at 70 to 100 pounds per square inch gauge pressure (p.s.i.g.), have been applied through spaced apertures against a fibrous starting material so as to rearrange laterally the individual fibers into a pattern determined by the pattern of the apertures. These prior art products rely on binder to attain strength.

Guerin U.S. Patent No. 3,214,819 issued Nov. 2, 1965, teaches the formation of noncored felts, cored felts and felts with a backing, by applying jets of liquid to a plurality of layers of loosely associated textile fibers to produce a reorientation of some fibers between laminations to provide a fiber-locking and entanglement, in the product, having a strength equal to a normal needle loomed fabric and with greater flexibility and diversification. The patent also discloses that when an adhesive such as resin in liquid form is added the binder is permeated through the material to anchor the fibers in their new oriented form and increase the tensile strength and abrasion resistance. The present invention provides important improvements over the teaching of the Guerin patent.

SUMMARY OF THE INVENTION

The present invention provides improvements in the process for producing substantially nonpatterned nonwoven fabric from bulk fibrous materials wherein a layer of fibers on a supporting member is treated with liquid jet streams to consolidate the fibers into a self-coherent fabric. The invention provides a more efficient process which is suitable for producing more uniform and stronger nonwoven products. The invention is particularly useful for processing nonfeltable fibers and filaments, i.e., synthetic and cellulosic fibers and filaments, including cotton, rayon and cellulose derivatives. Preferred embodiments provide new smooth-surfaced textile fabrics having substantially uniformly dense structures. Other advantages will become apparent from the specification and claims.

The process of the present invention comprises supporting a layer of fibrous material on a smooth supporting member for treatment, jetting liquid supplied at a pressure of at least 200 pounds per square inch gauge from orifices less than about 0.015 inch in diameter to form fine streams having over 23,000 energy flux in foot-poundals/inch² second at the treatment distance, and traversing the supported layer of fibrous material with the streams along paths centered less than about 0.1 inch apart to apply a treatment energy of at least 0.1 horsepower-hour per pound of fabric product.

The above process is applicable to continuous filaments as well as fibers of textile length and shorter. Unless otherwise indicated these will all be referred to as fibers. The fine liquid streams are advantageously formed by jetting water from orifices 0.002 to 0.015 inch in diameter arranged in a line in a manifold at a frequency of at least 10 orifices per inch, and preferably 20 to 40 orifices per inch, although a frequency of 5 orifices per inch can also be used as illustrated in the examples. Orifices must be used which will provide at least 23,000 foot-poundals/inch² second of energy flux at the treatment distance, as explained in detail subsequently. Preferably the streams are essentially columnar.

The rate at which the layer of fibrous material is traversed with the streams and the number of times the layer is treated should provide a total treatment energy of at least 0.1 horsepower-hour per pound of fabric (HP-hr./lb.). As subsequently explained, it is frequently desirable to apply much higher treatment energies. Adequate treatment with the streams will provide strong, durable fabrics. For products having sufficient surface stability to withstand repeated washing without the use of binders, the treatment energy is preferably greater than 1 HP-hr./lb. Preferably, water pressures of at least 500 p.s.i.g. are used to reduce the treatment time.

During treatment, the layer of fibrous material is supported by a member which does not influence the arrangement of the fibers into a pattern dependent on the supporting surface. This type of member will be simply called a "smooth supporting member" hereinafter, and it may be a solid plate, bar, roll or the like, or it may be a relatively smooth screen of sufficiently fine mesh so that the fibers are not rearranged into any pattern dependent on the screen pattern.

The process of the present invention may be used to produce two types of nonwoven fabrics, namely (1) a line-entangled product and (2) a substantially uniformly entangled product, depending upon whether the streams of jetted liquid are allowed to act directly on the fibrous layer or are oscillated or interrupted in their passage toward the layer, the layer being treated on a supporting member as discussed above. For either type of fabric, it has been found that a synergistic effect with respect to producing a strong fabric (preferably having a tensile strength of at least 2 lbs./in. per oz./yd.$^2$) is obtained by the use of small diameter orifices (0.002 to 0.010 inch in diameter), which are closely spaced (at least 10 per inch and preferably 20 to 40 per inch) and high pressures (greater than 200 p.s.i.g. and preferably at least 500 p.s.i.g.), for products weighing less than 10 ounces per square yard.

When the process of the present invention is operated so that essentially columnar streams of liquid, such as water, emerge from the orifices and pass directly into contact with the layer of fibers (on the supporting member), along parallel, continuous paths, which are straight, curved or zig-zag, one produces a nonwoven fabric having lines of entanglement in a straight, curved or zig-zag pattern determined by the paths of the streams and corresponding in number and frequency to the number and frequency of the orifices. This type of line-entangled product may have a distinct jet-track pattern. The jet-track pattern can be emphasized by carrying out the treatment so that the parallel streams pass repeatedly along the same paths, as illustrated in Example II. Entanglement and hence strength can be increased by repeated treatment or by prolonged treatment, for example by slow passage of the streams over the layer.

When the above treatment is carried out while oscillating the jet streams at high frequency (e.g., 300 cycles per minute for 2 yards/minute web speed), or while interrupting them, soft, smooth-surfaced and substantially uniformly dense products can be made even from lightweight materials, e.g., as shown in Example IX. Interrupting the jet streams before they reach the fibrous layer is carried out so as to form intermittent essentially columnar streams. A preferred method of accomplishing this is to place a screen or the like (referred to hereinafter as a "streams-interrupting-member") in the path of the jet streams at a point between the orifices and the plane of the fibrous layer and to oscillate the streams-interrupting-member through the streams to provide a high frequency of interruption during treatment. The streams-interrupting-member is not used to restrain the fibrous layer or to influence rearrangement of the fibers of the layer into a pattern. Preparation of nonwoven textile fabrics by this method is illustrated in Example X.

The substantially nonpatterned, nonwoven textile fabrics of the present invention are generally smooth-surfaced, dense and strong; their strength is due to fiber entanglement, which is achieved without the use of feltable fibers (such as wool) or of conventional needle-punching.

In particular, the substantially nonpatterned nonwoven fabrics of the present invention are characterized by having a substantially uniformly dense structure of interentangled fibrous material selected from the group consisting of cellulosic and synthetic textile fibers and filaments, fiber segments oriented transversely to the plane of the fabric being randomly distributed as opposed to clustered, the fabric being characterized by a fiber entanglement completeness $\bar{c}$ of at least 0.5 and an entanglement frequency $\bar{f}$ of at least 25 per inch when measured in the bond-free condition, and the fiber interlock value being at least 10.

A particular advantage of the present invention is that these dense, substantially nonpatterned, nonwoven fabrics can be made at low basis weights of less than 8 ounces per square yard, and much lower, as shown in the examples.

The substantially uniformly dense structure of the products is readily apparent when viewed by transmitted light as illustrated in FIGURE 17. The nature of the interentangled fiber structure is illustrated in FIGURES 18 to 20, and can be seen with a microscope. The substantial absence of clusters of fiber segments oriented transversely to the plane of the fabric distinguishes these products from heavy needle-punched felts or similar products of processes in which fiber webs are treated at spaced sites. FIGURE 21 illustrates the clusters of transverse fiber segments in a commercial needle-punched felt. When such photomicrographs are evaluated for clusters as disclosed near the end of the specification, clustering coefficients of less than 2.5 are found for structures of types shown in FIGURES 18 to 20, as contrasted with a clustering coefficient of 3.8 for FIGURE 21.

Determination of entanglement completeness, entanglement frequency and fiber-interlock values is described near the end of the specification. By "bond-free" is meant that the fibers of the nonwoven fabric are not adhered with binder or interfiber fusion bonds. In other words, the nonwoven fabric is tested to determine the properties due solely to the interentangled fiber structure.

By "interentangled" is meant that the individual fibers of the structure are intertwined, tangled, interlaced and otherwise joined with each other so as to be virtually inseparable. The process may be applied to preselected areas of the layer of fibrous material up to and including its entire area. When the treated area is viewed in cross-section, it is observed that a number of fiber segments have been reoriented in the direction generally perpendicular to the plane of the nonwoven fabric by the action of the streams. It is believed that these fibers contribute to the strength of the nonwoven fabric by serving to tie other fibers in place.

The term "layer of fibrous material" includes any layer composed of fibrous elements in the form of staple fibers, continuous filaments, and/or yarns in the form of mats, batts, webs or the like and including layered composites and blends thereof.

Nonwoven fabrics having particularly high levels of drape and conformability can be obtained by using crimpable, spontaneously elongatable, or elastic fibers as one of the components of the fibrous sheet material and developing the latent properties of the fiber after formation of the nonwoven fabric.

BRIEF DESCRIPTION OF THE DRAWINGS

This invention can be more thoroughly understood by the following discussion, with reference to the drawings wherein:

FIGURE 6 is a schematic isometric view of an apparatus for the high speed, continuous production of nonwoven fabrics.

FIGURE 7 is a schematic side view of apparatus for continuously feeding and opening staple fibers, forming a web and jet treating the web to form nonwoven fabrics.

FIGURES 10, 11 and 12 are diagrammatic representations of cross-sections of a batt of fibers at three stages of treatment.

FIGURE 13 is a photograph showing the upstream face of the nonwoven fabric of Sample F of Example 1. The upstream face is the one nearest the jet streams during final treatment.

FIGURE 14 is a photograph showing the downstream face of the fabric of FIGURE 13. The downstream face is that adjacent the supporting screen during final treatment.

FIGURE 15 and FIGURE 16 are 10× enlarged views of the fabrics of FIGURES 13 and 14.

EQUIPMENT

Figure 1:
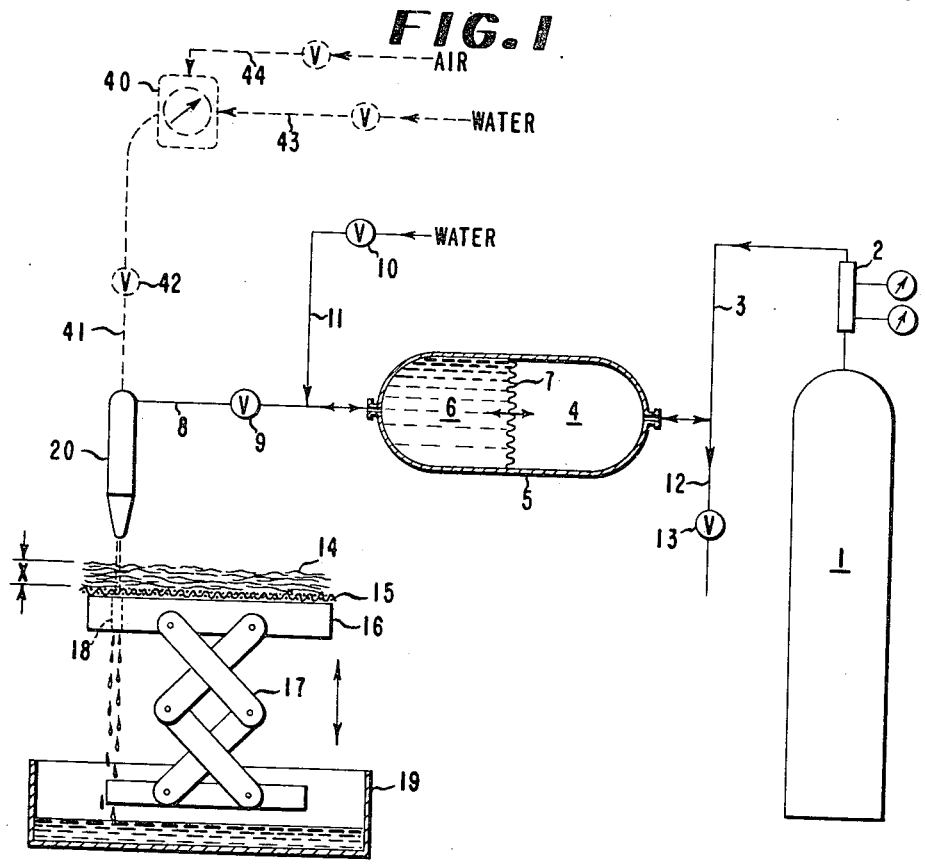
FIGURE 1 shows a schematic view of one type of apparatus for carrying out the process of this invention.
Figure 2A:
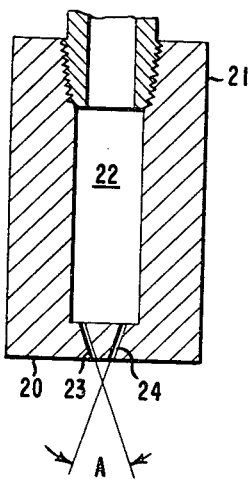
FIGURES 2a–2c are axial cross-sectional views of suitable nozzles.
Figure 2B:
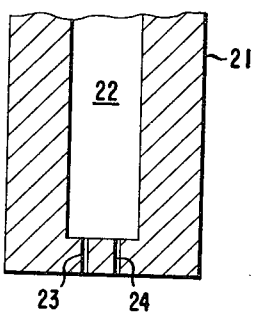
Figure 2C:
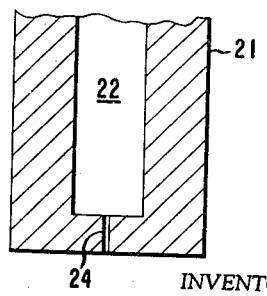

A relatively simple form of equipment for treating fibrous webs with water at the required high pressure is illustrated in FIGURE 1. Nitrogen under a pressure of 2000 lbs./sq. in. in a bottle 1 is connected through a regulating valve 2 and pipe 3 to one chamber 4 of a hydraulic accumulator 5. The hydraulic accumulator is separated into two chambers 4 and 6 by a flexible diaphragm 7. The second chamber 6 is connected to a nozzle 20 through a pipe 8 in which a valve 9 is provided. Water is supplied to the second chamber from a source of water (not shown) through a valve 10 and a pipe 11. When water is added, pressure is released from the first chamber through pipe 12 by opening a valve 13. Starting with an unpressurized situation, the system is charged by closing regulating valve 2, opening valve 13 so that atmospheric pressure prevails in the system, closing valve 9 and opening valve 10 to admit water at a pressure of about 40 lbs./sq. in. gauge; the water pushes the diaphragm 7 of the accumulator 5 to the right into chamber 4, thus filling chamber 6. After chamber 6 is filled, valves 10 and 13 are closed, regulating valve 2 is opened and adjusted to deliver nitrogen at about 2000 lbs./sq. in. gauge to the chamber 4; this pressurizes the water in chamber 6 so that the system is ready to deliver water to the nozzle 20 through line 8 whenever valve 9 is opened. The nozzle 20 may be any one of a variety of nozzles depending on the effect desired. Various types of nozzles which may be used are shown in FIGURES 2a–2c.

The fibrous sheet material to be treated 14 is placed on a generally rectangular wire screen carrier 15 situated below the vertically disposed nozzle 20 and supported on a horizontal, flat plate 16. A jack 17 of the scissors type supports plate 16 so as to be vertically adjustable, providing for adjustment in the distance between the tip of the nozzle 20 and the screen 15. The screen, in this case, is an ordinary woven one of 80 by 80 mesh per inch and is made of 0.005-inch diameter stainless steel wire. The screen is not secured to plate 16 but is free to be moved manually in a horizontal plane in any direction.

The plate 16 is provided with a vent hole 18 which is vertically aligned with the axis of the nozzle 20 so as to pass liquid which issues from the nozzle; a tray 19 is adapted to catch any liquid which falls through vent hole 18.

The following example will illustrate operation of this apparatus for treating a staple fiber batt to produce a jet-track-patterned product. A loose batt 14 of randomly arrayed staple fibers is laid on screen support 15. The jack 17 is adjusted vertically so as to position the upper face of the batt about 1 inch below the tip of nozzle 20. The batt is then exposed to the action of the high velocity stream of water while simultaneously being passed horizontally along a straight line in one direction. A series of batts, ranging in thickness from 1/16 to 3 inches are processed in this manner, successive passes being made along lines parallel to the first pass. Some of the batts are also subjected to successive passes along lines at right angles to the first passes. In all instances, it is observed that along the lines of liquid treatment, the fibers of the batt are driven generally downward, thus tending to consolidate the batt; in addition, the fibers are entangled and intertwined with one another, in general, in a discrete continuous line corresponding to the path of treatment of the liquid stream.

The nozzle shown in FIGURE 2a is adapted to be connected to pipe line 8 and consists of a body 21 having an axial bore 22 which is generally closed at the bottom end except for a pair of orifices 23, 24 which are coplanar with each other and with the axis of the bore 22 and are inclined toward each other, in the direction of the liquid flow, at an included angle A. This angle is about 20° to 25° and the orifices are 0.007 inch in diameter. Liquid streams emerging from the orifices 23, 24 are continuous but tend to break up as the two streams impinge on each other. In the use of this type of nozzle, the sheet material is placed either above or at the point of intersection of the streams.

A variation of the nozzle of FIGURE 2a is shown in FIGURE 2b, in which a pair of 0.007″ diameter orifices 23, 24 are disposed parallel to each other and coplanar with the bore 22.

The nozzle shown in FIGURE 2c is similar to that shown in FIGURE 2a, except that a single central orifice 24 is used; this orfice is coaxial with the bore 22. At a pressure of about 1,000 lb./sq. in., a single 0.007-inch diameter orifice will deliver about 14.5 lbs. of water per hour, and at 2,000 lbs./sq. in., 20.5 lb./hr.

Figure 3:
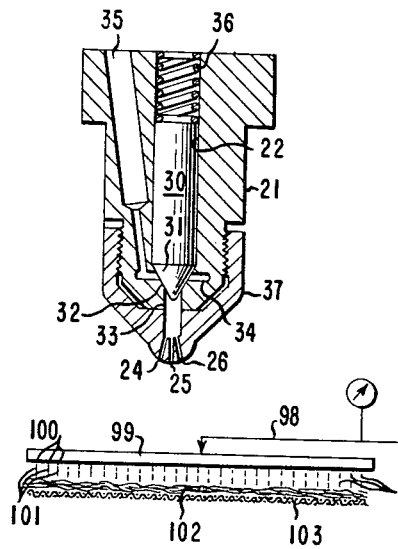
FIGURE 3 is a cross-sectional view, taken along the longitudinal axis, of a nozzle which may be used to produce intermittent columnar flow.

The nozzle shown in FIGURE 3 can be used when intermittent flow is desired. It resembles a diesel-engine type of fuel injection nozzle. The body 21 has an axial bore 22 in which a close-fitting cylindrical plunger 30 is situated. The plunger has a conical tip 31 adapted to form a fluid-tight seal in a mating conical seat 32 at the lower part of the bore 30. Axial passage 33, of smaller diameter than bore 22, opens downward from the conical seat. An annular space 34 is cut into the conical seat. A liquid supply passage 35 is drilled downward through body 21 along side of bore 22 to communicate with the annular space. Plunger 30 is urged downward against the conical seat at a pressure determined by adjusting a spring 36. When this pressure is exceeded by liquid supplied to space 39 through passage 35, then plunger 30 is forced upward and liquid passes downward through axial passage 33. A nozzle tip 37 screws onto the lower end of body 21 and is provided with orifices, such as orifices 24, 25, 26, which direct liquid from passage 33 downward in columnar flow. Any of the orifice arrangements shown in FIGURES 2a–2c can be used. Another suitable tip is provided with a central orifice 0.50 mm. in diameter surrounded by six orifices 0.45 mm. in diameter and equally spaced on a 50° included angle cone in the manner illustrated for orifices 24, 25 and 26.

When the nozzle of FIGURE 3 is used in the apparatus of FIGURE 1, intermittent impulses of high pressure liquid are supplied by an intensifier 40, a standard piece of equipment which, when supplied with driving air at a pressure of 40 p.s.i.g. will boost the water pressure to about 20,000 pounds per-square-inch gauge in short pulses having a frequency of about one pulse per second. This is supplied to nozzle 20 through line 41 provided with a throttling valve 42. Water and air are supplied to the intensifier through lines 43 and 44, respectively. The hydraulic accumulator system described previously is not used when the intensifier is used, so line 8 is disconnected. The fibrous sheet material is treated in the same manner as before but the pulses of high velocity liquid, formed with the intensifier and nozzle of FIGURE 3, pierce the sheet material at intervals along the path of traverse under the nozzle. Short discrete seam-like lines of entanglement and/or point seams are produced at each spot pierced by the intermittent stream. The frequency and duration of the liquid pulses may be controlled by adjusting spring 36, by throttling with valve 42, and by selection of the nozzle tip 37, to produce streams in the range of 0.0005 to 0.005 inch in diameter which impinge on the fabric at pressures of the order of 3000 pounds per square inch in the desired seaming pattern.

Figure 5:
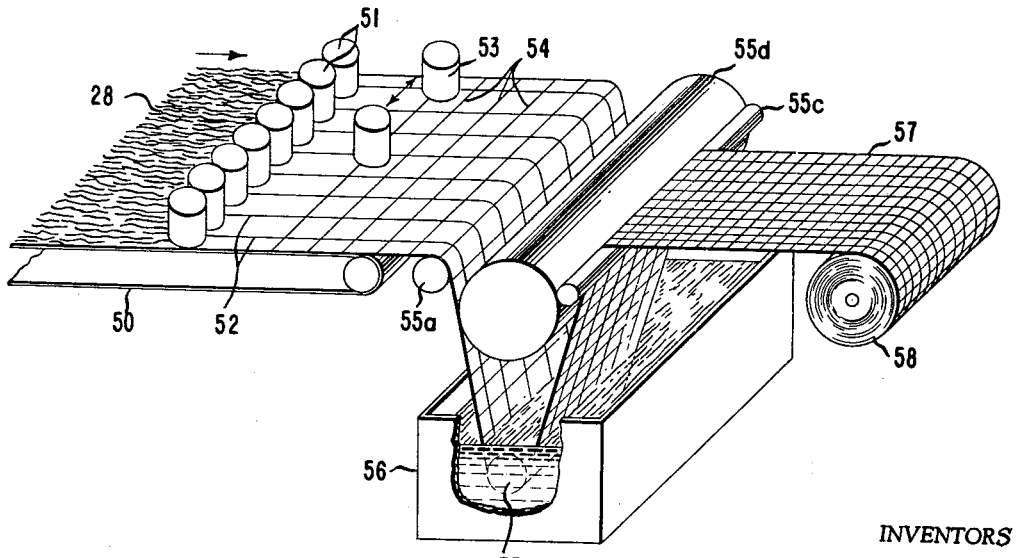
FIGURE 5 is a schematic isometric view of an apparatus for the high speed production of a continuous nonwoven fabric.

Instead of using individual nozzles and subjecting the fibrous sheet to a number of successive passes, a plurality of nozzles arranged in a row and spaced any desired distance apart may be used to increase the area of treatment in a single pass. By this method, parallel "seams," i.e., lines of entanglement, as close to each other as 0.025 inch (40 per inch) or less can be produced in batt materials in two directions, changing their appearance to that of a woven fabric. Apparatus for the continuous production of a non-woven fabric by this process is shown schematically in FIGURE 5.

In the apparatus, a horizontal, belt-type screen conveyor 50 is adapted to transport a batt of fibers 28 in the direction of the arrow. Transverse of the conveyor is a plurality of spaced stationary nozzles 51 which are adapated to modify the batt along lines disposed in the direction of batt travel as denoted by the lines 52. Downstream of the nozzles 51 are one of more nozzles 53 which are arranged to be reciprocated transversely of the batt (by a mechanism not shown) so as to modify the batt along the lines 54 which are generally perpendicular to the lines 52. Still further downstream is a series of rollers 55a, b, c and d which change the direction of the modified batt, causing it to be momentarily immersed in a liquid filled tank 56 for shrinkage, dyeing, bleaching, etc., as desired. At the extreme right is a windup 58 for receiving product 57. The roller 55d may be used for pressing or wringing the modified batt, heat treating or drying it, embossing it, etc.

In operation, a batt of fibers 28 is advanced from left to right under the various nozzles where is it modified (either continuously or intermittently) in one or more directions; if desired, the batt then travels to the liquid bath where it is shrunk, being subsequently dried or partially dried, and finally wound on a suitable core.

Figure 4:
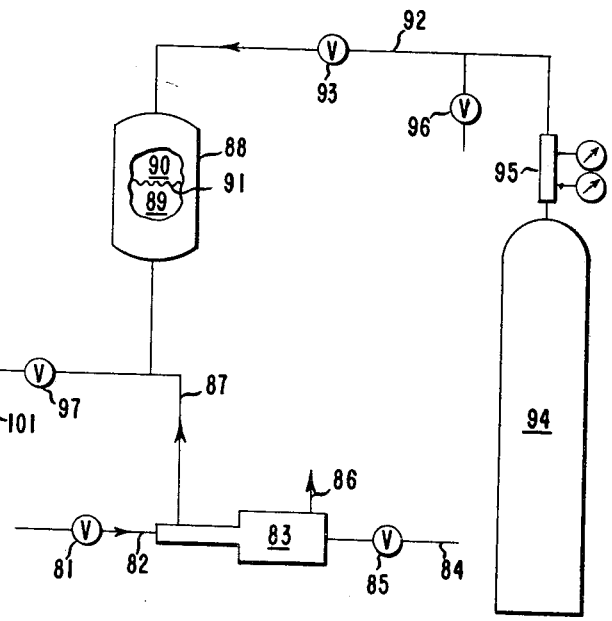
FIGURE 4 is a schematic view of one apparatus for carrying out the process of this invention.

An apparatus for the continuous treatment of fibrous sheets is shown in FIGURE 4. Water at normal city pressure of approximately 70 pounds/sq. in. gauge is supplied through valve 81 and pipe 82 to a high pressure hydraulic pump 83. The pump may be a double-acting, single plunger pump operated by air from line 84 (source not shown) through pressure regulating valve 85. Air is exhausted from the pump through line 86. Water at the desired pressure, e.g., 2000 lbs./sq. in., is discharged from the pump through line 87. A hydraulic accumulator 88 is connected to the high pressure water line 87. The accumulator serves to even out pulsations and fluctuations in pressure from the pump 83. The accumulator is separated into two chambers 89 and 90 by a flexible diaphragm 91. Chamber 90 is filled with nitrogen at a pressure of ⅓ to ⅔ of the desired operating water pressure and chamber 89 is then filled with water from pump 83. Nitrogen is supplied through pipe 92 and valve 93 from a nitrogen bottle 94 equipped with regulating valve 95. Nitrogen pressure can be released from the system through valve 96. Water at the desired pressure is delivered through valve 97 and pipe 98 to manifold 99 supplying orifices 100. The fine, essentially columnar streams of water 101 emerging from orifices 100 impinge on the material being treated 102, which is supported by conveyor screen 103.

The streams are traversed over the web, by moving the conveyor screen 103 and/or the manifold 99, until the web is treated in the desired areas at high energy flux. In general, it is preferred that the initial fibrous layer be treated by moving conveyor screen 103 under a number of fine, essentially columnar streams, spaced apart across the width of the material being treated. Rows or banks of such spaced-apart streams can be utilized for more rapid, continuous production of nonwoven fabrics. Such banks may be at right-angles to the direction of travel of the web, or at other angles, and may be arranged to oscillate to provide more uniform treatment. Streams of progressively increasing energy flux may be impinged on the web during travel under the banks. The streams may be made to rotate or oscillate during production of the nonwoven fabrics, may be of steady or pulsating flow, and may be directed perpendicular to the plane of the web or at other angles provided that they impinge on the web at sufficiently high energy flux.

Another apparatus suitable for the continuous production of nonwoven fabrics in accordance with the present invention is shown schematically in FIGURE 6. A pump 65, which may be one of the types used for supplying water to high pressure steam boilers, is used to provide liquid at the required pressure. A fibrous layer 60, prepared by conventional means such as a card machine or random web air-laydown equipment, is supplied continuously to a moving carrier belt 61 of flexible foraminous material, such as a screen or a solid belt. The carrier belt is supported on two or more rolls 62 and 63 provided with suitable driving means (not shown) for moving the belt forward continuously. Six banks or orifice manifolds are supported above the belt to impinge liquid streams 64 on the fibrous layer at successive positions during its travel on the carrier belt. The fibrous layer passes first under orifice manifolds 66 and 68, which are adjustably mounted. Orifice manifolds 74, 75, 76 and 77 are adjustably mounted on frame 78. One end of the frame is supported for movement on a bearing 79, which is fixed in position. The opposite end of the frame is supported on oscillator means 80 for moving the frame back and forth across the fibrous layer.

High pressure liquid is supplied from the reservoir to the orifice manifolds through pipe 18. Each manifold is connected to pipe 18 through a separate line which includes flexible tubing 48, a needle valve 45 for adjusting the pressure, a pressure gage 46, and a filter 47 to protect the valve and jet orifices from foreign particles. As indicated on the gages in the drawing, the valves are adjusted to supply each successive orifice manifold at a higher pressure, so that the fibrous layer 60 is treated at increasingly higher energy flux during travel under the liquid streams 64. However, the conditions are readily adjusted to provide the desired treatment of different initial fibrous layers.

FIGURE 7 illustrates a combined apparatus for continuous processing of staple fiber stock, as received from the supplier, to convert the material into a nonwoven fabric. The stock is fed through a conventional opener or picker 788 and the opened stock is carried on conveyor belt 789 to a conventional card machine. The stock is fed by lickerin 780 to card cylinder 781 where the fibers are combined, the fibers are collected on doffer 785 and are taken off through calender 786 and are introduced into a layer-forming apparatus. The fibers are carried on elevating apron 755 until removed by stripper apron 758 and are collected on condenser roll 763 to form a preliminary layer. The lickerin 767 separates the fibers and the fibers are deposited on condenser roll 771 to form a uniform layer of randomly arranged fibers. The layer is supported on conveyer belt 774 until it passes through calender 775 to be made sufficiently self-supporting for subsequent treatment. The resulting layer 778 passes to the jet-treating apparatus, described below, for conversion to a nonwoven fabric. Apparatus for continuous drying and windup of the fabric is also indicated.

The layer-forming apparatus processes a given weight of material at a relatively slow rate, whereas the jet-treating apparatus is capable of high speed operation. Increasing the speed of the layer-forming apparatus will result in a lighter weight layer. Therefore, it may be desirable to provide more than one layer-forming apparatus, combine the layers, and feed the combination of layers to the jet-treating apparatus. When the layers are of the same material, the treatment will produce a homogeneous product with no evidence of lamination. However, different types of layers can be combined for special purposes and they will be securely entangled together by the jet treatment.

The jet-treating apparatus shown has three treatment drums 790, 791 and 792. With this arrangement, the fabric formed on the first drum can be treated from the reverse face on the second drum and, if desired, given an additional treatment on the third drum, all in a continuous, uninterrupted operation. However, one or two of the drums can be by-passed when treatment thereon is not desired. As shown in FIGURE 7, the layer 778 travels continuously from the layer-forming apparatus to the first treatment drum 790. A guide roll 793 is shown, and additional guiding or supporting means may be provided in order to feed the layer smoothly onto the cylindrical surface of the drum. The drum rotates counter-clockwise and carries the layer beneath a plurality of jet-treatment manifolds 794. The fabric produced then leaves the first drum and travels over a series of guide rolls 795 to the second treatment drum 791. This drum rotates clockwise and the fabric is fed onto it so that the previously treated face is next to the cylindrical surface of the drum. The fabric is carried beneath a plurality of jet-treatment manifolds 796 to treat the face of the fabric opposite to that previously treated. From the second drum the fabric is guided by a series of rolls 797 to the third treatment drum 792. This drum rotates counter-clockwise to carry the fabric beneath a plurality of jet-treatment manifolds 798. This completes the treatment with liquid jets and the fabric leaves the drum at guide roll 799.

The jet-treated fabric passes to a wringer 700 to partially remove the treating liquid. The fabric is guided by a series of rolls 701 to conventional drying cans or drums 702, which are heated to dry the fabric. The dry fabric proceeds to a conventional type of fabric wind-up 703.

The used treating liquid falls into a drip tank 705 and is recovered, except for a small amount carried in the fabric to the drying apparatus. The liquid is withdrawn from the tank through drain 706, is passed through a filter 707 to remove any fibers or foreign matter, and continues through pipe 708 to pump 709. A multiple-piston, positive-displacement pump powered by an electric motor 710 is preferable. A multiple-stage centrifugal pump can be used, but is less efficient for pumping large volumes of liquid at high pressure. Since a piston pump causes pulsation surges, even when there are five or more pistons, a pulsation dampener 711 is provided in high pressure pump line 712. A conventional fluid-filled, in-line pulsation dampener is preferable in large scale operation, instead of the gas-dampener shown in FIGURE 4, because of the simplicity and greater safety provided when high pressure liquid is supplied at a substantial rate. The treating liquid flows from dampener 711 to a second filter 713 designed to remove any remaining particles of material large enough to plug the jet orifices. A pleated woven screen which will remove any particles of larger than 25 microns in size is preferred. The filtered liquid then flows into a feed manifold 714 which supplies the jet manifolds 794, 796 and 798. Conventional pressure-control and high-pressure-relief valves (not shown) should be provided to supply the liquid at the desired pressure with safety.

Figure 8:
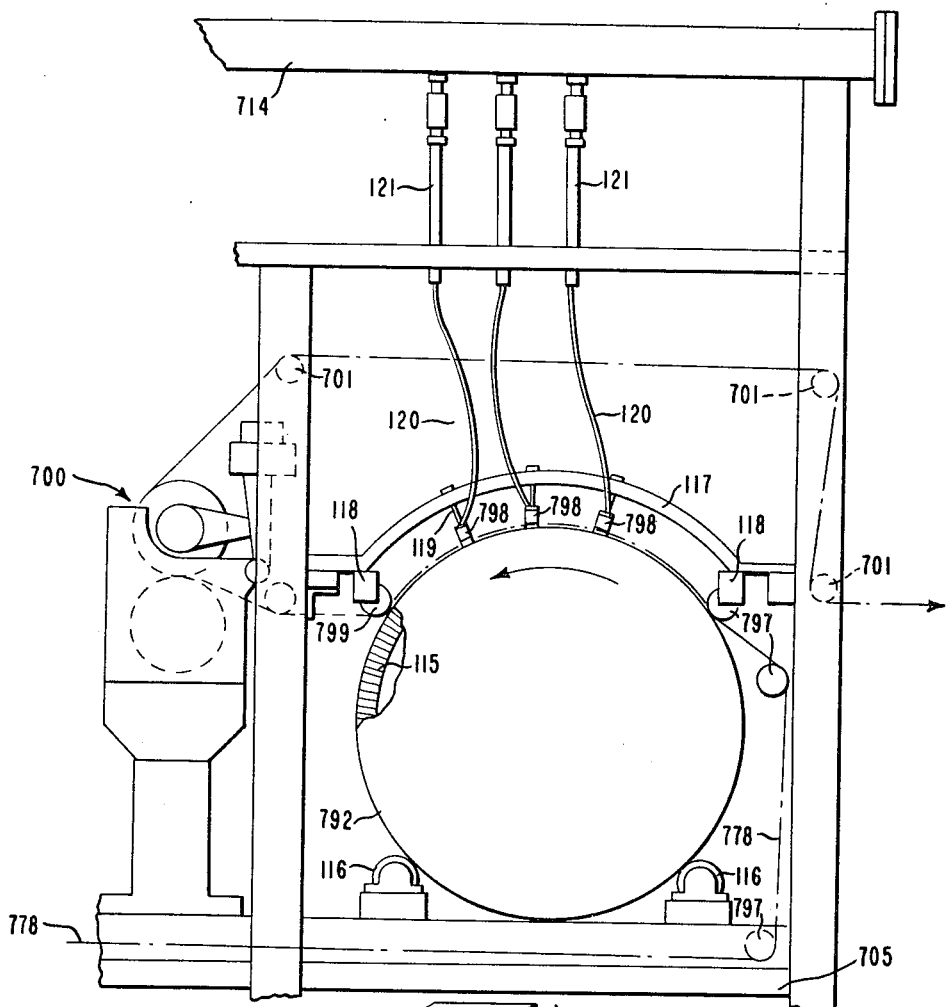
FIGURE 8 is an enlarged side-sectional view of one of the jet-treating machines in FIGURE 7.

Further details of the jet treating apparatus are shown in FIGURE 8. The single treatment drum illustrated is similar to the third drum of FIGURE 7 and the elements are correspondingly numbered. The fibrous material for treatment may come directly from the layer-forming apparatus, without previous jet treatment. Layer 778 is guided by rolls 797 onto the cylindrical surface of the treatment drum 792, is carried under jet manifolds 798, leaves the drum at guide roll 799, passes through wringer 700, and is guided by rolls 701 to drying apparatus.

The treatment drum is constructed so that the cylindrical surface contacting the fiber layer is a fine mesh screen or solid surface. A member which does not have sufficient rigidity, such as a woven wire screen, must be supported. A honeycomb support 115, made of thin sheet metal with about ⅛-inch cells and at least 1 inch in thickness, is preferred. The circular ends of the treatment drum rest on rollers 116.

The jet manifolds 798 are mounted on frame 117 which is supported on bearing blocks 118 at four corners of the frame. Drive means can be connected to the frame by means of an eccentric to impart a circular oscillation to the frame and the jet manifolds mounted thereon. The jet manifolds are mounted on the frame by adjustable means 119 and are supplied with high pressure liquid through flexible hoses 120, which are connected to high pressure manifold 714 by suitable fittings 121.

Figure 9:
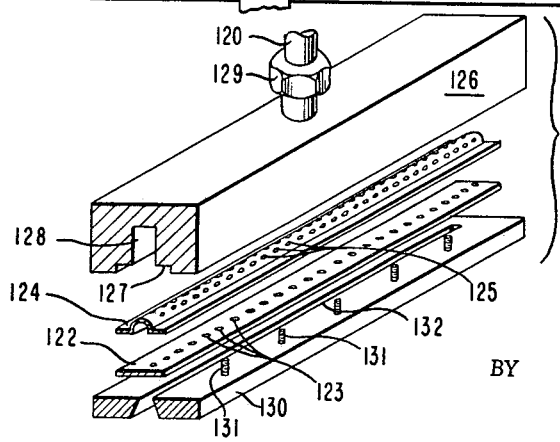
FIGURE 9 is an exploded isometric view of one of the jet manifolds in FIGURE 8.

FIGURE 9 is an isometric view of a portion of jet manifold 798, shown at a larger scale and with the parts separated for clarity. Along the central axis of flat metal strip 122 are equally-spaced jet orifices 123. Above this jet strip is a perforated filter plate 124 which has the same outer dimensions as the jet strip but is curved upward along the central axis so that the plate is spaced away from the jet orifices. The plate is perforated with holes 125, which should not be larger than the jet orifices if intended to catch particles of foreign matter before they can plug the jet orifices. The holes are preferably smoothly rounded and uniformly arranged along the curved portion of the plate to provide an even flow of liquid to the different jet orifices. A sufficient number of holes to provide about 3.5 percent open area produces an even flow of liquid without excessive pressure drop through the filter plate. The manifold body 126 has an undercut portion 127, for receiving the filter plate and jet strip, and has a slot 128 which forms a liquid chamber above the filter plate. Fitting 129 connects to flexible hose 120 for introducing high pressure liquid into the chamber. A heavy retainer plate 130 is secured to the manifold body by bolts 131 to hold the filter plate and jet strip in place in undercut portion 127 with a liquid-tight seal. A slit 132 extends along the central axis of the retainer plate to expose the jet orifices 123.

PROCESS

The mechanism of the process of this invention appears to be one in which the fibers of the sheet material are caused to move, intertwine, or interlace with other fibers under the influence of high velocity liquid streams. The behavior of the fibers is best described with reference to FIGURES 10, 11 and 12. FIGURE 10 shows a cross-section of a substantially unmodified batt of randomly arrayed fibers. It may be seen that carded and cross-lapped filaments are arrayed in strata in which individual filaments are more or less parallel to the horizontal; the filaments are not parallel to each other but are dispersed more or less randomly. The approximate boundaries of the strata are defined by horizontal lines; these lines are not intended to depict staple fibers. The behavoir of one filament 170, marked with X's along its length, is reviewed below.

In FIGURE 10, the filament 170 is seen to lie in the unmodified batt near the top of the batt and generally parallel to the plane of the batt. Liquid streams 138 are shown impinging on the top face of the batt.

FIGURE 11 shows the same batt after a short duration exposure to a high velocity liquid stream 138. In FIGURE 11, the filament 170 is seen to be driven substantially through the entire thickness of the batt at two points 171 and 172. The liquid streams penetrate the full thickness of the batt and impinge upon the backing. The primary function of the backing is to serve as a support for the batt material. Preferably a screen or similar material, which will permit the flow of water therethrough, is used. As it impinges on the backing, the stream or a portion thereof may be deflected, i.e., proceed in a generally horizontal direction or in the plane of the batt, carrying filaments therewith as shown by the loop in the filament at point 173. At this stage, the filament 170 is rather thoroughly entangled with its neighbors and vice versa. In effect, the various strata of the batt are "sewn" or "stitched" together by the migration and interentangling of the fibers.

FIGURE 12 shows the same batt after it has been manually turned over and treated with high velocity liquid streams on its reverse side. It is seen that further interentanglement and intertwining of the filaments occurs in random fashion so that the batt becomes highly coherent in the region in which it is treated by the liquid streams. Examination of the treated batt reveals that some filaments essentially pierce the batt at several different locations, thus acting as randomly dispersed sewing threads. The treated batt generally exhibits considerable tensile strength on a three-dimensional scale and also shows a markedly increased resistance to surface abrasion.

While the description just given does not specify the area of the batt that was treated, obviously any area up to and including the total area may be treated depending on the type of end product desired.

In order to obtain the high-strength nonwoven fabrics of the present invention, it is essential that the initial material be subjected to the action of streams of a noncompressible fluid at sufficiently high energy flux and for a sufficient amount of treatment to entangle the fibers thereof. The energy flux EF of the streams will depend upon the jet device used, the pressure of the liquid supplied to the jet orifice, and the orifice-to-web spacing during treatment. The liquid initially forms a "solid" stream, i.e., an unbroken, homogeneous liquid stream. The initial energy flux, in foot-poundals per square inch per second, is readily calculated by the formula, $$EF_i = 77 \ PG/a$$

where:

P = the liquid pressure in p.s.i.g.
G = the volumetric flow of the stream in cu.ft./minute, and
a = the initial cross-sectional area of the stream in square inches.

The value of G for use in the above formula can be obtained by measuring the flow rate of the stream. The initial cross-sectional area $a$, which is inside the jet device, can be determined by measuring the actual orifice area and multiplying by the discharge coefficient (usually 0.64), or it can be calculated from measured flow rates. Since the area $a$ corresponds to solid stream flow, the above formula gives the maximum value of energy flux which can be obtained at the pressure and flow rate used. The energy flux will usually decrease rapidly as the stream travels away from the orifice, even when using carefully shaped orifices. The stream diverges to an area A just prior to impact against the web and the kinetic energy of the stream is spread over this larger area. The cross-sectional area A can be estimated from photographs of the stream with the web removed, or can be measured with micrometer probes. The energy flux is then equal to the initial energy flux times the stream density ratio $(a/A)$. Therefore, the formula for energy flux at the web being treated is:

$$EF_w = 77 \ PG/A \ \text{ft.-poundals/in.}^2 \ \text{sec.}$$

The value of A increases with the orifice-to-web spacing and, at a given treatment distance, the value depends upon the jet device and the liquid supply pressure used. A pressure of 200 p.s.i.g. can provide sufficient energy flux for several inches when using a highly efficient jet device, e.g., as in Examples I, II, III-B, IV-B, V-B, VI and VII. With other jet devices, the energy flux of a stream may become too low in a relatively short distance even when using higher pressures, due to the stream breaking up and losing its columnar form. When this occurs, there is a sudden increase in the value of A and the energy flux drops rapidly. Since the stream may become less stable when higher pressures are used, the energy flux at a given treatment distance may actually decrease when the jet orifice pressure is increased to provide a higher initial energy flux $(PG/a)$. Some stream density $(a/A)$ and energy flux determinations for water streams from drilled-tube orifice manifolds, of types used in Examples III-A, IV-A and V-A are given in the following tables:

ENERGY FLUX VALUES FOR DRILLED TUBE ORIFICES

| | Distance Below Orifice | | |
|---|---|---|---|
| | ⅛ inch | ¾ inch | 1.5 inch |
| For 3 Mil Orifice Diameter: | | | |
| 200 p.s.i.g.: | | | |
| Stream Density (a/A) | 0.0758 | 0.0625 | 0.0545 |
| Energy flux | 85,000 | 70,000 | 61,000 |
| 500 p.s.i.g.: | | | |
| Stream density (a/A) | 0.0758 | 0.0522 | 0.0405 |
| Energy flux | 330,000 | 230,000 | 180,000 |
| 1,000 p.s.i.g.: | | | |
| Stream density (a/A) | 0.0758 | 0.0441 | 0.0349 |
| Energy flux | 940,000 | 540,000 | 430,000 |
| 1,500 p.s.i.g.: | | | |
| Stream density (a/A) | 0.0758 | 0.0405 | 0.0304 |
| Energy flux | 1,720,000 | 920,000 | 690,000 |
| For 5 Mil Orifice Diameter: | | | |
| 200 p.s.i.g.: | | | |
| Stream density (a/A) | 0.241 | 0.103 | 0.0785 |
| Energy flux | 270,000 | 115,000 | 88,000 |
| 500 p.s.i.g.: | | | |
| Stream density (a/A) | 0.214 | 0.0763 | 0.0565 |
| Energy flux | 930,000 | 330,000 | 250,000 |
| 1,000 p.s.i.g.: | | | |
| Stream density (a/A) | 0.190 | 0.0595 | 0.0108 |
| Energy flux | 2,340,000 | 730,000 | 130,000 |
| For 7 Mil Orifice Diameter: | | | |
| 200 p.s.i.g.: | | | |
| Stream density (a/A) | 0.357 | 0.125 | 0.0563 |
| Energy flux | 400,000 | 140,000 | 63,000 |
| 500 p.s.i.g.: | | | |
| Stream density (a/A) | 0.281 | 0.097 | 0.037 |
| Energy flux | 1,225,000 | 421,000 | 162,000 |
| 1,000 p.s.i.g.: | | | |
| Stream density (a/A) | 0.236 | 0.079 | 0.0196 |
| Energy flux | 2,910,000 | 972,000 | 242,000 |
| 1,500 p.s.i.g.: | | | |
| Stream density (a/A) | 0.236 | 0.0645 | 0.0125 |
| Energy flux | 5,350,000 | 1,460,000 | 283,000 |

The high strength, nonwoven fabrics of the present invention can be produced by treating the web with streams of water jetted at sufficiently high pressure and having an energy flux EF of at least 23,000 ft.-poundals per inch$^2$ second. Such streams are preferably obtained by propelling a suitable liquid, such as water, at high pressure through small-diameter orifices under conditions such that the emerging streams remain essentially columnar at least until they strike the initial material. By "essentially columnar" is meant that the streams have a total divergence angle of not greater than about 5 degrees. Particularly, strong and surface-stable fabrics are obtained with high-pressure liquid streams having an angle of divergence of less than about 3 degrees.

The amount of treatment must be sufficient and is measured by energy expended per pound of fabric produced. The energy $E_1$ expended during one passage under a manifold in the preparation of a given nonwoven fabric, in horsepower-hours per pound of fabric, may be calculated from the formula:

$$E_1 = 0.125 \, (YPG/sb)$$

where:

Y = number of orifices per linear inch of manifold,
P = pressure of liquid in the manifold in p.s.i.g.,
G = volumetric flow in cu.ft./min./orifice,
s = speed of passage of the web under the streams, in ft./min., and
b = the weight of the fabric produced, in oz./yd.$^2$.

The total amount of energy expended in treating the web is the sum of the individual energy values for each pass under each manifold, if there is more than one.

When treating fibrous material with streams of water impinged on the material at an energy flux EF of at least 23,000 ft.-poundals/in.$^2$ sec., jet-track-patterned entangled nonwoven fabrics can be prepared at expenditures of energy of at least about 0.1 HP-hr./lb. of fabric. At any given set of processing conditions, surface stability of the nonwoven fabric obtained (i.e., the resistance of the fabric to surface pilling and fuzzing) can be improved by increasing the total amount of energy E used in preparing the fabric. There is, however, a maximum energy of about 5–10 HP-hr./lb. beyond which little additional surface stability is developed. For products with sufficient surface stability to withstand repeated launderings, such as might be required for certain apparel and other uses, an energy flux EF of at least 100,000 ft.-poundals/in.$^2$ sec. and an energy E greater than 1 HP-hr./lb. of fabric are preferred.

The process of the present invention may be used to produce entangled nonwoven fabrics from any type of loose fibrous web, batt, or sheet. The ease with which a given web can be entangled is dependent upon many factors, and process conditions may be chosen accordingly. Fiber mobility also has a bearing on the ease with which a web can be processed. Factors which influence fiber mobility include, for example, the density, modulus stiffness, surface-friction properties, denier, crimp and/or length of the fibers in the web. In general, fibers which are highly wettable, or have a high degree of crimp, or have a low modulus or low denier, can also be processed more readily.

If desired, the initial fibers or layer may be treated first with a wetting agent or other surface agent to increase the ease of processing, or such agents may be included in the liquid stream.

Depending upon the nature of the initial fibrous layer and the nonwoven fabric to be produced, the energy flux exerted by the liquid streams may be adjusted as desired by varying the size of the orifices from which the streams emerge, the pressure at which the liquid is delivered, the distance the web is separated from the orifices, and the type of orifice. Other process variables, which may be manipulated in order to achieve the desired nonwoven fabric include the speed of the fibrous sheet, the number of times it is passed into the path of the streams, and/or the directions in which it is passed into the path of the streams.

Wherever the columnar streams act on the sheet, individual fibers in the sheet are forced into an interentangled relationship with each other in all dimensions of the sheet. A single stream, or a multiplicity of streams spaced a preselected distance apart, depending on the effect desired, may be applied continuously or intermittently to the sheet material in a direction perpendicular or oblique to its surface. The fibrous sheet material may be treated along its lengthwise direction and/or transversely and/or obliquely thereto. The fibrous sheet material may be treated from one side only or from both sides, the latter being carried out in successive steps.

The individual streams must be of sufficient fineness to produce the desired filament interentanglement without permanently separating groups of fibers, i.e., without forming openings in the sheet. In general, the streams are formed by orifices of 2 to 15 mils in diameter (preferably less than 10 mils). Orifice size may also be varied depending on the material to be treated and the effect desired. In general, for treating loose fibrous batts and the like it is preferred to vary the orifice size according to the basis weight of the sheet and the denier of the fibers therein. Preferably small diameter orifices are used for low basis weight, low denier materials, while larger orifices are used as the weight or denier increases.

During treatment, the fibrous web can be supported by a screen or other apertured support or a solid surface such as a flat plate or a bar. If a screen or similar apertured support is used, it is preferably selected in accordance with conditions illustrated in the examples. As shown in the examples, jet-track-patterned nonwoven fabrics and substantially nonpatterned nonwoven fabrics can be prepared on a variety of screens by adjusting these variables or by treating the web while supported against a solid plate or bar.

Example I

This example illustrates the treatment of different initial materials with streams of water issuing from 0.015-inch orifices to prepare nonwoven fabrics having seams arranged in a crisscross pattern.

A 2.5 oz./yd.$^2$ web of randomly disposed fibers is prepared by a random web air-laying technique from 3.7 denier per fiber (d.p.f.), Australian tops wool. By assembling layers of this web, a series of initial materials of 5, 10 and 20 oz./yd.$^2$ is prepared. A similar series of initial materials is prepared from a blend of 50% by weight of 1.5 denier per fiber (d.p.f.), 1.5-inch long, acrylic fibers and 50% by weight of 1.5 denier per fiber, 0.25-inch long rayon fibers.

Using apparatus of the type shown in FIGURE 4, each initial material is treated with essentially columnar streams of water issuing from orifices drilled in line in a manifold at a spacing of 5 orifices per inch. Special care is taken in the cleaning and boring of the orifices to get as sharp an entry into the orifice as possible to minimize any breaking up of the stream issuing from the orifice. Uniformity of water distribution to the orifices is facilitated by use of a cylindrical filter which is mounted coaxially within the manifold assembly, spaced from the walls thereof, and extends over the full length of the assembly. The filter is a fine mesh wire screen (80 x 80 wires per inch and 36% open area).

The initial material is placed on a support screen and is passed under the streams of water so that they traverse one major direction of the initial material, which is then removed from the screen, turned over, replaced on the support screen and treated in the direction transverse to the first treatment. Sufficient passes under the streams are used to provide for treating each initial material with an energy of approximately 2 HP-hr./lb. of initial material, the passes being equally divided between the two directions of treatment. During passage under the streams, the initial material is moved to about 2 yds./min. and is spaced about 1 inch from the orifices. The support screen is either a 20 mesh (20 x 20 wires/inch, 29% open area) or an 80 mesh (80 x 80 wires/inch, 30% open area) woven wire screen. Treatment conditions for each initial material are summarized in Table I.

The products obtained have criss-cross seam-like lines of fiber entanglement corresponding to the lines of passage of the liquid streams and spaced accordingly (i.e., 5 seams/inch). They are strong and fabric-like in aesthetics. When tested in the absence of any added bonding agent or further bonding method, the products have an entanglement completeness $\bar{c}$ greater than 0.5 and an entanglement frequency $\bar{f}$ greater than 18, as seen in Table I. Both faces of a representative product, sample F in Table I, are shown in the photographs of FIGURES 13 and 14 and at 10X in FIGURES 15 and 16.

size and spacing. During treatment the web is placed on a woven wire support screen of either 20 mesh (20 x 20 wires per inch, 29% open area) or 80 mesh (80 x 80 wires/inch, 36% open area), which screen serves to support the web and does not influence the final pattern of the nonwoven fabric because the jet streams are advanced repeatedly along the same paths to give a product having the same number of lines as there are orifices per inch. Treatment involves (1) passing the supported web under the streams of water so that they traverse one major direction of the material for a given number of passes, providing one-half of the total energy expended in the treatment, each pass following the same path so that the streams strike the web in the same place during each

TABLE I

| | Initial Material | | Processing Conditions | | | | | | Product Properties | | |
|---|---|---|---|---|---|---|---|---|---|---|---|
| Sample Code | Composition | Weight (oz./yd.$^2$) | Support Screen (mesh) | Orifice Size (inch) | Energy Flux of Streams (ft.-poundals/ in.$^2$ sec.) | Total No. of Passes | Energy Expended (HP-hr./ lb.) | Water Pressure (p.s.i.g.) | Strip Tensile Strength (lb./in.)/ (oz./yd.$^2$) | Entanglement Frequency ($\bar{f}$) (No./in.) | Entanglement Completeness ($\bar{c}$) |
| A | Acrylic/rayon | .5 | 20 | 0.015 | 1,100,000 | 64 | 2 | 200 | 1.3 | 23 | 0.53 |
| B | do | 5 | 80 | 0.015 | 1,100,000 | 67 | 2 | 200 | 1.7 | 19 | 0.45 |
| C | do | 5 | 80 | 0.015 | 4,400,000 | 18 | 2 | 500 | 3.0 | 39 | 0.62 |
| D | do | 10 | 20 | 0.015 | 1,100,000 | 128 | 2 | 200 | 1.3 | 22 | 0.54 |
| E | Wool | 5 | 80 | 0.015 | 1,100,000 | 67 | 2 | 200 | 1.9 | 21 | 0.88 |
| F | do | 10 | 20 | 0.015 | 1,100,000 | 128 | 2 | 200 | 1.5 | 19 | 0.79 |
| G | do | 20 | 20 | 0.015 | 1,100,000 | 256 | 2 | 200 | 1.1 | 20 | 0.88 |

Example II

This example illustrates the synergistic effect obtained when using small orifices, closely spaced and using water pressures greater than 200 p.s.i.g.

A series of samples, coded A through N, is prepared using as initial material a 2.5 oz./yd.$^2$ web of randomly disposed fibers prepared by a random web air-laying technique. Each web is prepared from a 50/50 blend, by weight, of 1.5-inch long, 1.5 denier per filament acrylic fibers and 0.25-inch long, 1.5 denier per filament rayon fibers. For each sample, the web is supported on a screen and treated by passing it back and forth under essentially columnar streams of water issuing from orifices drilled in line in a manifold to thereby produce in the web a series of lines of fiber entanglement corresponding in number to the number of orifices in the manifold. The orifices are carefully cleaned and bored to get as sharp an entry into the orifice as possible to minimize any breaking up of the stream issuing from the orifice. When using the manifolds having orifices spaced 5/inch, uniformity of water distribution to the orifices is facilitated by use of a cylindrical filter which is mounted coaxially within the manifold assembly, spaced from the walls thereof, and extends over the full length of the assembly. The filter is a fine-mesh wire screen (80 x 80 wires per inch and 36% open area). A manifold of the type shown in FIGURE 9 is used when the orifices are spaced 20/inch. Either arrangement is satisfactory regardless of orifice size and spacing.

pass, and (2) turning the web over, replacing it on the screen, and repeating the first treatment in a direction 90° thereto. Sufficient total passes under the streams are used to provide for total treatment of the web with an energy of approximately 2 HP-hr./lb. of web. During treatment, the web and screen support are moved on a conveyor belt at a speed of 2 yds./min. and the web is spaced about one inch from the orifices. Treatment conditions are summarized in Table II.

TABLE II

| Sample Code | Orifice Size (in.) | Orifices per Inch | Pressure (p.s.i.g.) | Total Passes (No.) | Energy (HP-hr./ lb.) | Energy Flux (ft.-poundals per in.$^2$-sec.) | Support Screen (mesh) | Strip Tensile Strength (lb./in. per oz./yd.$^2$) |
|---|---|---|---|---|---|---|---|---|
| A | 0.007 | 20 | 500 | 8 | 2 | 4.4×10$^6$ | 80 | 3.92 |
| B | 0.007 | 20 | 500 | 8 | 2 | 4.4×10$^6$ | 80 | 3.38 |
| C | 0.007 | 20 | 500 | 8 | 2 | 4.4×10$^6$ | 20 | 2.88 |
| D | 0.007 | 20 | 200 | 32 | 2 | 1.1×10$^6$ | 80 | 2.95 |
| E | 0.007 | 20 | 200 | 32 | 2 | 1.1×10$^6$ | 20 | 2.47 |
| F | 0.007 | 20 | 200 | 32 | 2 | 1.1×10$^6$ | 80 | 1.95 |
| G | 0.030 | 5 | 200 | 8 | 2 | 1.1×10$^6$ | 20 | 1.10 |
| H | 0.030 | 5 | 200 | 8 | 2 | 1.1×10$^6$ | 80 | (*) |
| I | 0.007 | 20 | 100 | 64 | 2 | 0.4×10$^6$ | 20 | 0.85 |
| J | 0.007 | 20 | 100 | 64 | 2 | 0.4×10$^6$ | 80 | (*) |
| K | 0.030 | 5 | 100 | 16 | 2 | 0.4×10$^6$ | 20 | 0.79 |
| L | 0.007 | 5 | 100 | 128 | 2 | 0.4×10$^6$ | 20 | 0.16 |
| M | 0.030 | 5 | 500 | 2 | 2 | 4.4×10$^6$ | 20 | (*) |
| N | 0.030 | 5 | 500 | 2 | 2 | 4.4×10$^6$ | 80 | (*) |

*Line-patterned product not achieved since particular screen/orifice size/pressure/web combinations led to bubbling, washing away, or blowing apart of the web.

Example III (A) In operating the process of this invention, velocity and consequently momentum of the discrete column of fluid contacting the fibers must be sufficiently high as to physically drive the fibers into an interentangled relationship with other fibers. The actual velocity required is dependent on the nature of the fibrous sheet to be treated and on the degree of fiber interentanglement desired. Velocity may be adjusted to any desired level, for example, by varying the pressure on the liquid in FIGURE 1. In Table III, the effect of varying the pressure and/or the orifice size is shown. In each case, the starting material is a continuous filament web. The web is placed on a 30-mesh screen and treated using apparatus of the type shown in FIGURE 4. The web is subjected to two passes, one transverse to the other, on each side of the web and is passed so as to just contact the orifices.

TABLE III

|  | Orifice (in.) | Orifice Spacing (No./in.) | Pressure (p.s.i.g.) | Strip Tensile Strength (lbs./in.²)/(oz./yd.²) | Elongation (percent) | Modulus (lbs./in.²)/(oz./yd.²) | Drape Flex. (cm.) |
|---|---|---|---|---|---|---|---|
| (a) | 0.0028 | 40 | 2,000 | 3.42 | 156 | 1.00 | 2.2 |
| (b) | 0.0028 | 40 | 1,000 | 0.53 | 87 | 0.40 | 1.9 |
| (c) | 0.0028 | 40 | 500 | 0.21 | 56 | 0.12 | 1.7 |
| (d) | 0.005 | 40 | 2,000 | 4.55 | 151 | 0.76 | 2.1 |
| (e) | 0.005 | 40 | 1,000 | 2.17 | 110 | 0.88 | 1.5 |
| (f) | 0.005 | 40 | 500 | 1.79 | 138 | 0.36 | 2.1 |
| (g) | 0.007 | 20 | 2,000 | 3.68 | 168 | 0.93 | 2.2 |
| (h) | 0.007 | 20 | 1,000 | 3.72 | 143 | 0.53 | 1.7 |
| (i) | 0.007 | 20 | 500 | 1.05 | 91 | 0.34 | 1.8 |
| Properties of untreated web for comparsion | | | | 0.14 | 53 | 0.07 | 1.6 |

(B) Additional samples are prepared using another initial web. The web is composed of randomly disposed, crimped, continuous, bicomponent filaments composed of equal weights of polyhexamethylene adipamide and a copolyamide of hexamethylene adipamide and hexamethylene sebacamide units (80/20). Filament denier is 2.6 and filament tenacity is 2.1 grams per denier. Specific processing conditions are given in Table IV. For each sample, a web is placed on a woven wire screen, which serves merely to support the web during treatment. The supported web is passed under essentially columnar streams of water from sharp-edged orifices arranged in line in a manifold at the given spacing per inch. The orifices are carefully cleaned and bored to get as sharp an entry into the orifice as possible to minimize any breaking up of the stream issuing from the orifice. Uniformity of water distribution to the orifices is facilitated by use of a manifold of the type shown in FIGURE 9. Unless otherwise indicated, each web is passed under the streams two times, one pass at right angles to the other, and is then turned over on the screen and again given 2 passes, one at right angles to the other, for a total of 4 passes. During treatment the web is spaced about 1 inch from the orifices, and is moved under the orifices on a conveyor belt, at the speeds indicated in Table IV.

All of the products are characterized by the presence of lines of entanglement when viewed from a least one surface of the product, corresponding in number to the number of orifices per inch in the treatment manifold, i.e., 20 or 40 lines of entanglement per inch. These entangled regions are present at sufficient frequency to provide strength and coherency to the nonwoven fabrics as may be seen from the tensile strength, ranging from 2.9 to 6.1 lbs./in. per oz./yd.² and entanglement completeness values $\bar{c}$ ranging from 0.94 to 1.3. Entanglement frequency values $\bar{f}$ range from 20 to 217, indicating adequate to excellent surface stability. The products of this invention as shown in Table IV were all prepared at energy flux values greater than $12 \times 10^6$ ft.-poundals/in.² sec. and energy values greater than 0.12 HP-hr./lb. of fabric.

TABLE IV

| Sample | Orifice Diameter (in.) | Orifice Spacing (No./in.) | Water Pressure (p.s.i.g.) | Belt Speed (yds./min.) | Support Screen (mesh)[a] | Energy Flux (ft.-poundals per in.² sec.) | Energy (HP-hr./lb.) |
|---|---|---|---|---|---|---|---|
| A | 0.0025 | 40 | 2,000 | 20 | 30 | 35×10⁶ | 0.12 |
| B | 0.0025 | 40 | 2,000 | 10 | 30 | 35×10⁶ | 0.29 |
| C | 0.0025 | 40 | 2,000 | 5 | 30 | 35×10⁶ | 0.65 |
| D | 0.005 | 40 | 2,000 | 20 | 30 | 35×10⁶ | 0.51 |
| E | 0.007 | 20 | 2,000 | 21 | 30 | 35×10⁶ | 0.35 |
| F | 0.007 | 20 | 2,000 | 10.6 | 30 | 35×10⁶ | 0.61 |
| G | 0.007 | 20 | 2,000 | 5.35 | 30 | 35×10⁶ | 1.04 |
| H | 0.007 | 20 | 2,000 | 40 | 30 | 35×10⁶ | 0.22 |
| I [c] | 0.007 | 20 | 2,000 | 21 | 30 | 35×10⁶ | 0.16 |
| J | 0.007 | 20 | 2,000 | 11 | 30 | 35×10⁶ | 0.51 |
| K | 0.007 | 20 | 2,000 | 5.5 | 30 | 35×10⁶ | 1.02 |
| L | 0.007 | 20 | 2,000 | 20 | 30 | 35×10⁶ | 0.39 |
| M | 0.007 | 20 | 2,000 | 10 | 30 | 35×10⁶ | 0.86 |
| N | 0.007 | 20 | 1,000 | 20 | 30 | 12×10⁶ | 0.14 |

| Sample | Entanglement Completeness ($\bar{c}$) | Entanglement Frequency ($\bar{f}$) | Web Weight (oz./yd.²) | Test Direction (MD or XD)[b] | Strip Tensile Strength (lb./in.)/(oz./yd.²) | Elongation (percent) | 5% Secant Modulus (lb./in.)/(oz./yd.²) |
|---|---|---|---|---|---|---|---|
| A | 1.2 | 29 | 3.61 | MD | 5.86 | 201.6 | 1.12 |
|   |     |    |      | XD | 5.20 | 213.0 | 1.27 |
| B | 1.2 | 20 | 2.96 | MD | 5.23 | 179.5 | 0.97 |
|   |     |    |      | XD | 4.34 | 217.5 | 0.79 |
| C | 1.0 | 34 | 2.63 | MD | 5.34 | 169 | 1.48 |
|   |     |    |      | XD | 4.64 | 182 | 1.43 |
| D | 1.2 | 40 | 3.33 | MD | 5.98 | 206.5 | 1.50 |
|   |     |    |      | XD | 4.13 | 190.7 | 1.64 |
| E |   |   | 4.66 | MD | 4.48 |   |   |
| F |   |   | 4.50 | MD | 5.38 |   |   |
| G |   |   | 5.94 | MD | 3.96 |   |   |
| H | 1.0 | 42 | 3.83 | MD | 2.91 | 184.1 | 0.81 |
| I [c] | [d]1.4 | [d]31 | 5.0 | MD | 4.2 |   |   |
| J | [d]1.0 | [d]142 | 6.1 | MD | 5.5 |   |   |
| K | [d]1.2 | [d]246 | 6.1 | MD | 5.5 |   |   |
| L | 0.94 | 58 | 4.41 | MD | 5.69 | 180.1 | 1.88 |
|   |      |    |      | XD | 4.73 | 202.0 | 1.72 |
| M | 1.2 | 217 | 3.93 | MD | 6.07 | 163.9 | 1.96 |
|   |     |     |      | XD | 4.28 | 190.0 | 1.79 |
| N | 1.3 | 26 | 4.14 | MD | 4.58 | 234.2 | 0.57 |

[a] 30 mesh is 30 x 30 wires/inch, 40% open area.
[b] MD is tested in direction of entanglement lines; XD is 90° thereto.
[c] Only 2 passes, one 90° to other.
[d] Only tested in MD.

Example IV (A) In operating the process of this invention, the fibrous sheet material is preferably treated while in contact with or fairly close to the orifice. As the distance from the orifice increases, passage of the liquid through the air causes turbulence and/or a breaking up of the columnar flow which reduces the extent or intensity of fiber interentanglement obtainable. This is illustrated in the table below with respect to treatment of a continuous filament web, using drilled-tube orifices of the type discussed prior to the examples in connection with the table of energy flux values, and a water pressure of 2000 p.s.i.g. Using tenacity as an indication of the extent of fiber interentanglement, it is observed from the table that the extent of fiber interentanglement generally decreases as the distance from the orifice increases. All other factors being equal, the extent of fiber interentanglement decreases as the pressure decreases.

to one another have lines of entanglement in 2 major directions of the fabric. The presence of lines of entanglement at these frequencies, i.e., 20 or 40/inch, provides good strength and coherence as may be seen from the following summary of the properties of the nonwovens:

Tensile strength: 6 to 8.5 (lb./in.)/(oz./yd.$^2$)
Entanglement completeness $\bar{c}$: 0.85 to 1.0
Entanglement frequency $\bar{f}$: 16 to 39
Energy (HP-hr./lb.): 0.31 to 1.47
Energy flux (ft.-poundals/in.$^2$ sec.): $4.4 \times 10^6$ to $35 \times 10^6$ From a comparison of Samples A and B with Sample C and of Samples H and I with Samples J and K, it may be seen that for a given set of conditions, including the particular manifold, initial web, etc., treatment efficiency decreases as the web-to-orifice spacing increases. Thus for the particular conditions of these samples, spacing of 5.6 inches was enough to break up the stream

| Orifice (in.) | Orifice Spacing (No./in.) | Web Spacing (in.) | Strip Tensile Strength (lbs./in.)/ (oz./yd.$^2$) | Elong. (percent) | Modulus (lbs./in.)/ (oz./yd.$^2$) | Drape Flex. (cm.) |
|---|---|---|---|---|---|---|
| 0.0028 | 40 | Contact | 3.42 | 156 | 1.00 | 2.2 |
| 0.0028 | 40 | 1 | 3.46 | 118 | 0.54 | 1.9 |
| 0.0028 | 40 | 2 | 2.60 | 122 | 0.58 | 2.1 |
| 0.0028 | 40 | 4 | Turbulence destroyed sample | | | |
| 0.007 | 20 | Contact | 3.68 | 168 | 0.93 | 2.2 |
| 0.007 | 20 | 1 | 1.31 | 123 | 0.27 | 1.5 |
| 0.007 | 20 | 2 | Turbulence destroyed sample | | | |
| 0.007 | 20 | 4 | Turbulence destroyed sample | | | |

(B) In a similar experiment, a series of samples is prepared using a web of continuous, polyethylene terephthalate filaments having a filament denier of 1.3 and a filament tenacity of 3.6 grams per denier. Processing conditions are as in Example III–B unless otherwise indicated in Table V. Products A, B and D through I are characterized by the presence of lines of entanglement corresponding in number to the number of orifices per inch in the treatment manifold, i.e., 20 or 40 lines of entanglement per inch. Products given 1 pass have entanglement lines in one direction only. Those given passes at 90° and make it sufficiently turbulent to prevent entanglement of the web in lines corresponding to the number of orifices.

TABLE V

| Sample | Orifice Diameter (in.) | Orifice Spacing (No./in.) | Web-Orifice Spacing (in.) | Water Pressure (p.s.i.g.) | No. of Passes | Belt Speed (yds./min.) | Support Screen (mesh)[a] |
|---|---|---|---|---|---|---|---|
| A | 0.0025 | 40 | 1 | (c) | (c) | 2.83 | 80 |
| B | 0.0025 | 40 | 1 | (c) | (c) | 0.71 | 80 |
| C | 0.0025 | 40 | 5.6 | (d) | (d) | 0.71 | 30 |
| D | 0.005 | 20 | 1 | 2,000 | e 4 | 12.5 | 30 |
| E | 0.005 | 20 | 1 | 500 | e 4 | 1.4 | 30 |
| F | 0.007 | 20 | 1 | 1,000 | e 4 | 7.5 | 30 |
| G | 0.007 | 20 | 1 | 500 | e 4 | 2.65 | 30 |
| H | 0.007 | 20 | 1 | (c) | (c) | 11.4 | 80 |
| I | 0.007 | 20 | 1 | (c) | (c) | 2.86 | 80 |
| J | 0.007 | 20 | 5.6 | (c) | (c) | 11.4 | 80 |
| K | 0.007 | 20 | 5.6 | (c) | (c) | 2.86 | 80 |

| Sample | Energy Flux (ft. poundals per in.$^2$ sec.) | Energy (HP-hrs./lb.) | Entanglement Completeness ($\bar{c}$) | Entanglement Frequency ($\bar{f}$) | Web Weight (oz./yd.$^2$) | Strip Tensile Strength (MD)[b] (lb./in.)/ (oz./yd.$^2$) | Strip Tensile Strength (XD)[b] (lb./in.)/ (oz./yd.$^2$) |
|---|---|---|---|---|---|---|---|
| A | 35×10$^6$ | 0.31 | 1.0 | 16 | 2.67 | 7.68 | 7.02 |
| B | 35×10$^6$ | 1.47 | 0.85 | 17 | 2.38 | 5.99 | 6.77 |
| C | 35×10$^6$ | 2.28 | (f) | (f) | 2.8 | (f) | (f) |
| D | 35×10$^6$ | 0.94 | 1.0 | 36 | 3.04 | 7.71 | 7.51 |
| E | 4.4×10$^6$ | 1.00 | 0.88 | 17 | 3.00 | 6.41 | 8.05 |
| F | 12×10$^6$ | 0.52 | 0.95 | 29 | 3.05 | 7.01 | 8.17 |
| G | 4.4×10$^6$ | 0.64 | 0.90 | 20 | 2.54 | 7.05 | 7.36 |
| H | 35×10$^6$ | 0.31 | 0.90 | 24 | 2.71 | 7.76 | 6.32 |
| I | 35×10$^6$ | 1.17 | 0.94 | 39 | 2.87 | 8.39 | 8.46 |
| J | 35×10$^6$ | 0.42 | (f) | (f) | 2.01 | 2.73 | 0.19 |
| K | 35×10$^6$ | 1.35 | (f) | (f) | 2.5 | (f) | (f) |

[a] 80 mesh=80 x 80 wires/in., 30% open area. 30 mesh=30 x 30 wires/in., 40% open area.
[b] MD tested in direction of lines of entanglement. XD tested 90° to MD.
[c] Complete treatment includes: 1 pass, 500 p.s.i.g., using 16 x 18 mesh, 71% open area top screen. Sample turned over—1 pass, 2,000 p.s.i.g., no top screen.
[d] Complete treatment includes: 1 pass, 500 p.s.i.g., using 16 x 18 mesh, 71% open area top screen. Sample turned over—1 pass, 2,000 p.s.i.g., using same top screen; 1 pass, 2,000 p.s.i.g., no top screen.
[e] 2 passes, 1 at 90° to other; sample turned over; 2 passes, 1 at 90° to other.
[f] Sample nonuniform; properties could not be determined.

Example V (A) The extent of fiber interentanglement obtainable at any given pressure can be increased by increasing the number of passes. The following table illustrates the effect of repeated passes on a continuous filament web. Apparatus of the type shown in FIGURE 4 is used. The sample is placed on a 30-mesh screen and is passed so as to just contact the 0.0028-inch orifices supplied with water at 1500 lbs./in.² Each treatment consists of two passes, one transverse to the other, per side of the web. There are 40 orifices per inch in the manifold.

| Treatments (sides) | Strip Tensile Strength (lbs./in.)/ (oz./yd.²) | Elong. (percent) | Modulus (lbs./in.)/ (oz./yd.²) | Drape Flex. (cm.) |
|---|---|---|---|---|
| 1 | 0.54 | 93 | 0.17 | 1.7 |
| 2 | 5.15 | 129 | 1.45 | 1.6 |
| 4 | 3.30 | 142 | 0.36 | 1.8 |

Orifice size may also be varied depending on the material to be treated and the effect desired. In general, for treating loose fibrous batts and the like, it is preferred to vary the orifice size according to the basis weight of the sheet and the denier of the fibers therein. Preferably, small diameter orifices (e.g., 0.0028 inch) are used for low basis weight, low denier materials, while larger orifices (e.g., 0.005 inch or 0.007 inch) are used as the basis weight or denier increases.

(B) Additional samples are prepared, using as initial material webs of the type described in Example IV–B. In treating the webs, the number of passes is varied from 1 to 8. However, all repeat passes involve moving the web under the streams along the same path as the first pass so that the streams strike the web in the same place during each pass. Other processing conditions are as in Example II unless otherwise specified in Table VI.

The products obtained, as viewed from one fabric face, have 40 lines of entanglement per inch in one major direction of the fabric. This provides good strength and stability in both directions of the fabric as may be seen from the properties in Table VI, wherein the following ranges are seen:

Strip tensile strength: 4.5 to 7.3 ₃lb./in.)/(oz./yd.²)
Entanglement completeness $\bar{c}$: 0.82 to 0.92
Entanglement frequency $\bar{f}$: 10 to 18
Energy: 0.15 to 1.16 HP-hr./lb.
Energy flux: 23×10⁶ ft.-poundals/in.² sec.

In general, for these webs, an energy of 0.15 is adequate to provide a strong, well-entangled product. Increasing the energy to 0.26 or more, all other conditions remaining unchanged improves the surface stability of the nonwoven fabric as shown by the increased entanglement frequency $\bar{f}$ values obtained in Samples B, C and D.

The initial material is a web of randomly disposed fibers prepared by random web air laying technique. The web contains 50% by weight of 1.5 inch, 1.5 denier acrylic fibers and 50% of 0.25 inch, 1.5 denier acrylic fibers, and weighs about 3 oz./yd.². The web is treated with essentially columnar streams of water issuing from 0.007-inch diameter orifices, drilled in a line in a manifold at a frequency of 20 orifices/inch. The web is held against the flat surface of a one-inch wide metal bar, which is held stationary during treatment. The web is spaced one inch from the orifices during treatment and is moved over the bar at a speed of 2 yards per minute. The streams of water strike the web and then the flat surface of the bar at about 90° to the flat surface. The web is passed under the streams once using a water pressure of 500 p.s.i.g. and once using 1000 p.s.i.g. It is then turned over and passed once more under the streams, at 1000 p.s.i.g. while held against the flat bar. Energy flux of the streams at 1000 p.s.i.g. is 12×10⁶ ft. poundals/in.² sec. and total energy expended in the treatment is 1.4 HP.-hr./lb. All passes are done in one major direction of the web and the resulting nonwoven fabric has 20 lines of entanglement per inch in one fabric direction, corresponding to the number of orifices per inch. This provides good strength and stability as can be seen from the following properties:

Strip tensile strength (lb./in.)/(oz./yd.²):
    MD _____ 4.6
    XD _____ 3.4
Elongation (percent):
    MD _____ 65
    XD _____ 76
5% secant modulus (lb./in.)/(oz./yd.²):
    MD _____ 0.4
    XD _____ 0.4
Entanglement completeness $\bar{c}$ _____ 0.98
Entanglement frequency $\bar{f}$ _____ 22
Surface stability:
    Top face _____ 3.8
    Bottom face _____ 4.5

Note:
MD: tested in direction of lines of entanglement
XD tested 90° to MD

Surface stability is determined as described near the end of the specification.

TABLE VI

| Sample | No. of Passes | Energy Flux (ft.-poundals per in.² sec.) | Energy Hp-hr./lb.) | Entanglement Completeness ($\bar{c}$) | Entanglement Frequency ($\bar{f}$) | Web Weight (oz./yd.²) | Test Direction (MD or XD) ᵃ | Strip Tensile Strength (lb./in.)/ (oz./yd.²) | Elongation (percent) | 5% Secant Modulus (lb./in.)/ (oz./yd.²) |
|---|---|---|---|---|---|---|---|---|---|---|
| A | 1 | 23×10⁶ | 0.15 | 0.87 | 10 | 2.47 | MD | 4.48 | 81.9 | 2.04 |
|   |   |   |   |   |   |   | XD | 6.80 | 81.5 | 4.67 |
| B | 2 | 23×10⁶ | 0.26 | 0.84 | 18 | 2.90 | MD | 6.67 | 101.2 | 3.00 |
|   |   |   |   |   |   |   | XD | 7.17 | 94.0 | 3.58 |
| C | 4 | 23×10⁶ | 0.61 | 0.82 | 17 | 2.46 | MD | 6.55 | 91.8 | 4.20 |
|   |   |   |   |   |   |   | XD | 6.84 | 83.4 | 4.63 |
| D | 8 | 23×10⁶ | 1.16 | 0.92 | 17 | 2.60 | MD | 7.13 | 81.0 | 5.84 |
|   |   |   |   |   |   |   | XD | 7.30 | 81.1 | 6.12 |

ᵃ MD is tested in direction of lines of entanglement; XD is tested 90° to MD.
Processing conditions common to all samples:
    Orifice diameter: 0.0025 inch.
    Orifices per inch: 40.
    Web-orifice spacing: 1 inch.
    Water pressure: 1,500 p.s.i.g.
    Belt speed: 3.64 yards per minute.
    Support screen: 30 x 30 wires/inch, 40% open area.

Example VI

This example illustrates preparation of a nonwoven fabric having 20 lines of entanglement per inch, using a flat bar to support the web during treatment.

Example VII

This example illustrates preparation of a nonpatterned nonwoven fabric using a flat, solid support plate for the web.

The initial material is a 2.9 oz./yd.² web of randomly disposed staple fibers, prepared by a random web airlaying technique and consists of 50% by weight of 1.5 inch, 1.5 denier per filament (d.p.f.), acrylic fibers and 50% by weight of 0.25 inch, 1.5 d.p.f. rayon fibers. The web is placed on a flat metal plate and is passed under essentially columnar streams of water issuing from 0.007-inch diameter orifices drilled in a single line, 21 inches long, on 0.05 inch centers (20/inch). During treatment, the plate is positioned so that the streams are directed against it at about 90° to its flat surface. Water temperature during treatment is about 60° C. The orifice manifold is oscillated at approximately 300 oscillations per minute; diameter of oscillation path is 0.5 inch. The web, supported on the plate, is passed under the streams at a speed of 2 yd./min. and spaced approximately 0.5 inch from the orifices. A coarse mesh screen is placed over the web during the entire treatment to restrain the web. Processing is as follows:

1 pass using 500 p.s.i.g. pressure, 2 passes using 1000 p.s.i.g. pressure, sample turned over on the plate, and 2 passes using 1000 p.s.i.g. pressure. All passes are done in one major direction of the web. Energy flux of the streams is $12 \times 10^6$ ft.-poundals/inch² sec. and total energy expended is 2.2 HP-hr./lb. Properties of the final fabric are as follows:

Weight (oz./yd.²) _____ 2.3
Strip tensile strength (lb./in.)/(oz./yd.²):
  MD _____ 4.2
  XD _____ 3.4
Elongation (percent):
  MD _____ 61
  XD _____ 82
Entanglement completeness $(\bar{c})$ _____ 0.7
Entanglement frequency $(\bar{f})$ _____ 43
Surface stability (both faces) _____ 3.8

Note:

MD=tested in one major direction
XD=tested 90° to MD

Surface stability is determined as described near the end of the specification.

As can be seen from the foregoing discussion and the examples, the process of this invention offers a high speed economical route to the production of a wide variety of textile products. In order to obtain the high degree of fiber interentanglement which characterizes the products of this invention, the starting material is acted upon by discrete columnar streams of liquid moving at high energy flux.

The fluid must be a liquid, since the stream must be capable of maintaining its identity as a discrete column for a finite distance beyond its point of emergence from the orifice. Compressible fluids, such as air, nitrogen, or other gases, which diffuse rapidly upon emerging from a nozzle orifice, are not effective. The results obtained by treatment with water and nitrogen are compared in the following example.

Example VIII

A loose web consisting of randomly disposed continuous filaments is used as the starting material. Using apparatus of the type shown in FIGURE 4, a sample of the web is placed on a 30-mesh screen and passed in contact with 0.0028-inch orifices on 0.025-inch centers (40 orifices/inch) supplied with water at 2000 p.s.i.g. pressure. Two passes are used, one transverse to the other, on each side of the web. The web is removed, dried and examined. The loose web is observed to have been converted into a stable coherent non-woven fabric. A second sample is similarly treated except that 0.007-inch orifices on 0.050-inch (20 orifices per inch) centers are used and the sample is placed on a 30-mesh screen. Properties of the untreated and treated webs are given in the following table:

|  | Strip Tensile Strength (lbs./in.)/ (oz./yd.²) | Elong. (percent) | Modulus (lbs./in.)/ (oz./yd.²) | Drape Flex (cm.) |
|---|---|---|---|---|
| Untreated web | 0.14 | 53 | 0.07 | 1.6 |
| 0.0028 inch orifice | 3.42 | 156 | 1.00 | 2.2 |
| 0.007 inch orifice | 3.68 | 168 | 0.93 | 2.2 |

The marked increase in tensile strength of the water-treated samples shows that a high degree of fiber interentanglement has occurred.

The above two experiments are then repeated on additional samples of the web under identical conditions except that nitrogen at 2000 p.s.i.g. pressure is used instead of water. The nitrogen-treated samples are removed and examined. A few surface fibers appear to have been blown around but no other visible effect is noted. The strength of these samples is substantially unchanged from that of the untreated web.

The above experiments are then repeated using a staple fiber batt as the starting material. Again, treatment with the high velocity liquid streams is observed to interentangle the fibers whereas treatment with the gaseous streams has no effect.

In a final test in this series, a sample of the staple batt is first moistened with water and then subjected to the action of nitrogen from 0.007-inch orifices at 2000 p.s.i.g. pressure. No fiber interentanglement is observed.

Example IX

This example illustrates the synergistic effect obtained by using small orifices, close spacing, and water pressures greater than 200 p.s.i.g., for making substantially non-patterned products.

(A) A series of samples, coded A through Q, is prepared, using as initial material a 2.5 oz./yd.² web of randomly-disposed fibers prepared by an air-laying technique. Each web is prepared from a 50/50 blend, by weight, 1.5 inches long, 1.5 denier per fiber acrylic fibers and 0.25 inch long, 1.5 denier per fiber rayon fibers. For preparation of each sample, the web is supported on a screen (80 x 80 wires/inch, 31% open area) and passed under the jet streams at 2 yards/minute. The total passes under the jet streams are listed in Table VII; half the passes are done with the streams contacting one side of the web, after which the web is turned over on the screen and treated with the remaining number of passes under the streams. The streams are essentially columnar streams of 50° C. temperature water issuing from orifices drilled in line in a manifold which is oscillated at 300 r.p.m.; the orifices being about one inch from the web during treatment. The orifices are carefully cleaned and bored to get as sharp an entry into the orifice as possible to minimize any breaking up of the streams issuing from the orifice. When using manifolds having orifices spaced 5 per inch, uniform water distribution to the orifices is facilitated by use of a cylindrical filter which is mounted coaxially within the manifold assembly, spaced from the walls thereof, and extends over the full length of the assembly. The filter is a fine-mesh wire screen (80 x 80 wires/inch and 36% open area). A manifold of the type shown in FIGURE 9 is used when the orifices are spaced 20 per inch. Either arrangement is satisfactory regardless of orifice size and spacing. During treatment, sufficient total passes under the streams are used to provide for total treatment of the web with an energy of the order of 2 HP-hr./lb. of web. Actual treatment energies are given in Table VII. During treatment, vacuum is employed under the support screen (13 inches of water). The support screen does not influence the final pattern of the nonwoven fabric because of its fine mesh in relation to the other conditions employed; a slight surface pattern corresponding to the oscillation pattern of the jets is seen in the final product; however, the product is smooth, dense and when viewed by transmitted light shows a substantially uniform distribution of fibers area-wise. The treatment reorients fiber segments transversely with respect to the plane of the web, i.e., in the thickness direction of the web; these transversely disposed fiber segments are substantially randomly distributed throughout the area of the fabric.

Samples A through G of Table VII show what happens when pressure is varied for the indicated orifice size (0.030-inch diameter orifice) and spacing (5 orifices per inch). Thus, for this orifice and spacing, a pressure of 100 p.s.i.g. yields products with tensile strength of about 0.7 (lb./in.)/(oz./yd.$^2$). Strength increases to about 1.5 (lbs./in.)/(oz./yd.$^2$) at 200 p.s.i.g.; treatment at 1000 p.s.i.g. destroys the sample. All samples prepared with these large jets and this spacing have neither a smooth texture nor a nonpatterned appearance.

From Samples H through L, the effect of reducing orifice size, while keeping the same orifice spacing, can be seen. At 100 and 200 p.s.i.g., the smaller diameter orifice (0.007 inch) gives weaker products than did the 0.030 inch diameter orifice. Unexpectedly, however, at 500 p.s.i.g., strengths obtained with the 0.007-inch diameter orifice are higher than with the 0.030-inch diameter orifices. In addition, the products made with the 0.007-inch diameter orifice at spacing of 5 per inch are satisfactory in terms of aesthetic properties, i.e., appearance and texture.

The effect of both reducing the orifice size to 0.007 inch and increasing the orifice frequency from 5 per inch to 20 per inch can be seen from Samples M through Q of Table VII. At 100 and 200 p.s.i.g. the increased frequency does not yield greater tensile strength; however, as can be seen from Samples P and Q, the most desirable products from the standpoint of high strength and satisfactory appearance are achieved when all three conditions (small diameter orifices, close spacing, and high pressure) are employed; thus, at 500 p.s.i.g., with the 0.007-inch orifices spaced 20 per inch, a strength of 3.48 is achieved. This is further increased by going to 1000 p.s.i.g., as shown by Sample Q, where a tensile strength of 4.3 (lbs./in.)/(oz./yd.$^2$) is reached.

(B) In Table VIII, data for a similar set of products prepared using rayon fibers are shown. In Example IX–B, all process conditions are as shown in the table or as described for Example IX–A with the exception that the starting web is 100% rayon and has a nominal weight of 2 oz./yd.$^2$ for Samples A through M and 6 oz./yd.$^2$ for Samples N through V. For 2 oz./yd.$^2$ webs of rayon, it is seen from Table VIII that a tensile strength of about 2 (lbs./in.)/(oz./yd.$^2$) can be achieved at 200 p.s.i.g., when using the 0.007-inch diameter orifices spaced either 5 per inch or 20 per inch.

From Samples A to D of Table VIII, the effect of varying pressure when using 0.030-inch diameter orifices, spaced 5 per inch, is shown. No products having satisfactory appearance and texture are obtained. A tensile strength of 0.86 is obtained at 100 p.s.i.g., and of 1.48 at 200 p.s.i.g.; increasing the pressure to 500 and 1000 p.s.i.g. results in destruction of the sample.

Samples E through G, when compared to A through D, show the effect of decreasing orifice size from 0.030 to 0.007 inch in diameter, with spacing remaining at 5 per inch and the pressure being varied. All of the products E through G are satisfactory from the appearance standpoint. The sample prepared with 0.007-inch diameter orifices at 100 p.s.i.g. is weaker than that prepared with 0.030-inch orifice at 100 p.s.i.g. However, at 200 p.s.i.g. the reverse is true; increasing to 500 p.s.i.g. still further increases the strength to 3.37 (lbs./in.)/(oz./yd.$^2$) when 0.007-inch orifices are used, whereas 500 p.s.i.g. destroys the web when 0.030-inch orifices are used.

Samples H through M, when compared to E through G, illustrate the effect of increasing the orifice frequency from 5 to 20 orifices per inch. From Sample H vs. Sample E, it is seen that merely increasing the frequency, for the 0.007-inch diameter orifice, at 100 p.s.i.g., does not result in an increased strength. However, when small diameter orifices, close spacing, and 200 to 1000 p.s.i.g. pressure are used (Samples I to M), the most desirable products (strength and aesthetics) are obtained.

With the 6 oz./yd.$^2$ webs, the 0.030-inch diameter orifices, spaced 5 per inch (Samples N–Q), do not yield satisfactory products at 100 to 500 p.s.i.g.; 1000 p.s.i.g. destroys the web.

In contrast, when 0.007-inch diameter orifices, spaced 20 per inch are used (Samples R–V), strong products (3–4 lbs./in. per oz./yd.$^2$) with desirable appearance can be obtained at 500 to 1000 p.s.i.g.

TABLE VII

| Sample Code | Orifice Size (in.) | Orifices per inch | Pressure (p.s.i.g.) | Total Passes (No.) | Energy (HP-hr./lb.) | Energy Flux (ft. poundals per in.$^2$-sec.) | Product Weight (oz./yd.$^2$) | Strip Tensile Strength (lb./in. per oz./yd.$^2$)[a] | Product Appearance |
|---|---|---|---|---|---|---|---|---|---|
| A | 0.030 | 5 | 100 | 16 | 1.9 | 386,000 | 2.0 | 0.66 | NS |
| B | 0.030 | 5 | 100 | 16 | 1.8 | 386,000 | 2.13 | 0.74 | NS |
| C | 0.030 | 5 | 200 | 8 | 2.1 | 1,090,000 | 2.3 | 1.4 | NS |
| D | 0.030 | 5 | 200 | 8 | 2.1 | 1,090,000 | 2.36 | 1.6 | NS |
| E | 0.030 | 5 | 500 | 2 | 1.8 | 4,310,000 | 2.2 | 2.2 | NS |
| F | 0.030 | 5 | 500 | 4 | 2.2 | 4,310,000 | 3.65 | 2.32 | NS |
| G | 0.030 | 5 | 1,000 | 2 | 4.4 | 12,200,000 | | (b) | NS |
| H | 0.007 | 5 | 100 | 256 | 1.4 | 386,000 | 2.21 | 0.04 | S |
| I | 0.007 | 5 | 100 | 144 | 0.8 | 386,000 | 2.10 | 0.02 | S |
| J | 0.007 | 5 | 200 | 128 | 1.8 | 1,090,000 | 2.37 | 1.02 | S |
| K | 0.007 | 5 | 500 | 64 | 3.7 | 4,310,000 | 2.27 | 2.92 | S |
| L | 0.007 | 5 | 500 | 64 | 3.6 | 4,310,000 | 2.35 | 3.18 | S |
| M | 0.007 | 20 | 100 | 70 | 1.4 | 386,000 | 2.35 | 0.06 | S |
| N | 0.007 | 20 | 200 | 40 | 2.3 | 1,090,000 | 2.28 | 0.23 | S |
| O | 0.007 | 20 | 200 | 40 | 2.1 | 1,090,000 | 2.55 | 0.22 | S |
| P | 0.007 | 20 | 500 | 10 | 2.3 | 4,310,000 | 2.25 | 3.48 | S |
| Q | 0.007 | 20 | 1,000 | 4 | 2.6 | 12,200,000 | 2.31 | 4.31 | S |

[a] Average of MD and XD.
[b] Sample destroyed by streams.
NS=Not satisfactory for uses requiring smooth, dense nonpatterned appearance; all NS products have irregular, blotched appearance and lumpy texture.
S=Satisfactory for uses requiring smooth, dense, nonpatterned appearance.

TABLE VIII

| Sample Code | Orifice Size (in.) | Orifices per inch | Pressure (p.s.i.g.) | Total Passes (No.) | Energy (HP-hr./lb.) | Energy Flux (ft. poundals per in.²-sec.) | Product Weight (oz./yd.²) | Strip Tensile Strength (lb./in. per oz./yd.)ᵃ | Product Appearance |
|---|---|---|---|---|---|---|---|---|---|
| A | 0.030 | 5 | 100 | 16 | 2.1 | 386,000 | 1.79 | 0.86 | NS |
| B | 0.030 | 5 | 200 | 8 | 2.0 | 1,090,000 | 2.48 | 1.48 | NS |
| C | 0.030 | 5 | 500 | 4 | 4.0 | 4,310,000 | (ᵇ) | (ᵇ) | NS |
| D | 0.030 | 5 | 1,000 | 2 | 5.5 | 12,200,000 | (ᵇ) | (ᵇ) | NS |
| E | 0.007 | 5 | 100 | 256 | 1.5 | 386,000 | 2.02 | 0.35 | S |
| F | 0.007 | 5 | 200 | 128 | 2.1 | 1,090,000 | 2.06 | 2.14 | S |
| G | 0.007 | 5 | 500 | 64 | 4.2 | 4,310,000 | 2.03 | 3.37 | S |
| H | 0.007 | 20 | 100 | 70 | 1.7 | 386,000 | 1.98 | 0.11 | S |
| I | 0.007 | 20 | 200 | 20 | 1.3 | 1,090,000 | 2.03 | 2.07 | S |
| J | 0.007 | 20 | 200 | 40 | 2.5 | 1,090,000 | 2.09 | 1.69 | S |
| K | 0.007 | 20 | 500 | 8 | 2.1 | 4,310,000 | 1.97 | 3.58 | S |
| L | 0.007 | 20 | 1,000 | 2 | 1.5 | 12,200,000 | 2.07 | 3.66 | S |
| M | 0.007 | 20 | 1,000 | 4 | 3.0 | 12,200,000 | 2.13 | 3.47 | S |
| N | 0.030 | 5 | 100 | 32 | 1.4 | 386,000 | 5.53 | 1.68 | NS |
| O | 0.030 | 5 | 200 | 16 | 1.7 | 1,090,000 | 5.97 | 1.99 | NS |
| P | 0.030 | 5 | 500 | 8 | 2.0 | 4,310,000 | 7.94 | 1.72 | NS |
| Q | 0.030 | 5 | 1,000 | 4 | 3.7 | 12,200,000 | (ᵇ) | (ᵇ) | NS |
| R | 0.007 | 20 | 100 | 250 | 2.0 | 386,000 | | (ᶜ) | S |
| S | 0.007 | 20 | 200 | 100 | 2.2 | 1,090,000 | 6.13 | 0.33 | S |
| T | 0.007 | 20 | 500 | 22 | 1.9 | 4,310,000 | 6.03 | 3.66 | S |
| U | 0.007 | 20 | 1,000 | 4 | 1.0 | 12,200,000 | 6.70 | 4.39 | S |
| V | 0.007 | 20 | 1,000 | 8 | 1.9 | 12,200,000 | 6.45 | 4.23 | S |

ᵃ Average of MD and XD.
ᵇ Sample destroyed by streams.
ᶜ Too weak to test.
NS=Not satisfactory for uses requiring smooth, dense, nonpatterned appearance; all NS products have irregular blotched appearance and lumpy texture.
S=Satisfactory for uses requiring smooth, dense, nonpatterned appearance.

Example X

This example illustrates preparation of a substantially nonpatterned product by interrupting the essentially columnar streams before they strike the web.

The initial web is a web of randomly disposed fibers deposited by an air-laying technique (Rando-Webber). The web is prepared from a 50/50 blend, by weight, of 1.5 inch, 1.5 d.p.f. (denier per fiber) acrylic fibers and 0.25 inch, 1.5 d.p.f. rayon fibers. During treatment, the web is supported on an 80 x 80 wires/inch, 31% open area screen; an 18 x 14 wires/inch, 75% open area top screen is placed on the web to help hold it in place during treatment; neither screen serves as a patterning device. The assembly is moved under the streams at 2 yards per minute, spaced about one inch beneath the orifices. The manifold used is of the type shown in FIGURE 9. It has a single line of 0.005-inch diameter orifices, spaced 40 per inch. Essentially columnar streams of 60–70° C. water issue from the orifices. The orifices are carefully cleaned and bored to get as sharp an entry into the orifice as possible to minimize any breaking up of the streams issuing from the orifices. However, before the streams contact the web they are interrupted by oscillating (approximate frequency is 3 cycles per second) a screen in the path of the streams. This screen is spaced about midway between the orifices and the web surface while it is oscillated and serves to interrupt the passage of the streams. The oscillating screen used has 18 x 14 wires/inch and 75% open area. Web A receives two treatment steps:

Step 1: 2 passes under interrupted streams, while web is held between top and support screens; 750 p.s.i.g.

Step 2: 2 passes under interrupted streams, with top screen removed; 1000 p.s.i.g.

Web B is treated as in Steps 1 and 2; then turned over on the support screen; then treated again as in Steps 1 and 2.

Figure 17:
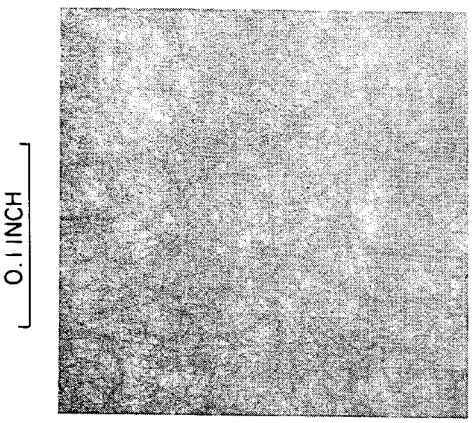
FIGURE 17 is a photomicrograph taken by light transmitted through fabric A of Example 10 to show the absence of pattern. The magnification is indicated by the scale beside the figure.
Figure 18:
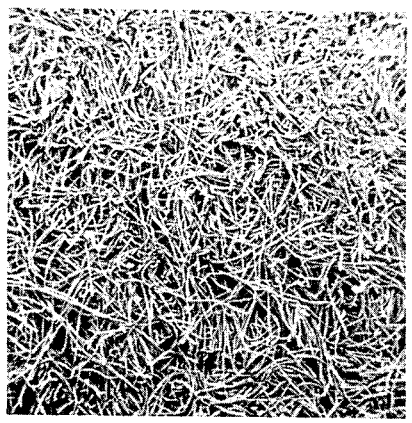
FIGURES 18 to 20 are photomicrographs, made with a scanning electron microscope, showing sectional views of the interiors of fabric produced as described in Examples 10A, 10B and 11, respectively. The section is taken in the plane of the fabric, approximately midway between the two faces. The scales beside the figures indicate magnification.
Figure 19:
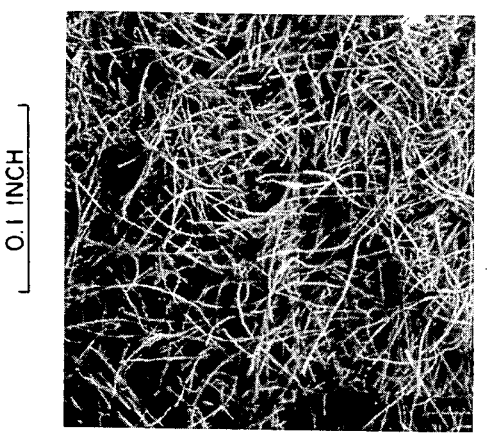
Figure 21:
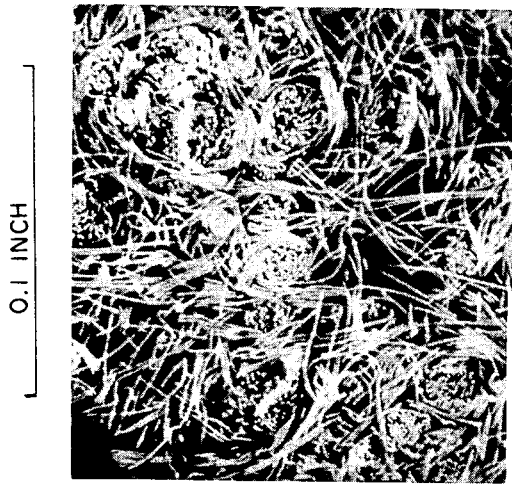
FIGURE 21 is a photomicrograph of a microsection slice taken approximately midway between the two faces of a commercial needle-punched felt to illustrate the transverse fiber clusters characteristic of such treatments. Magnification is shown by the scale beside the figure.

The resulting fabrics are smooth, dense, and nonpatterned in appearance as illustrated in FIGURE 17. FIGURE 17 is a photomicrograph of Fabric A, taken by light transmitted through the fabric. Lines of entanglement have been substantially avoided by use of the oscillating screen. A substantially uniform distribution of randomly oriented fibers is shown in FIGURE 18 of Fabric A and FIGURE 19 of Fabric B. FIGURES 18 and 19 are photomicrographs of the interior of the fabrics, made with a scanning electron microscope at the magnifications indicated by the scales at the sides of the figures. The fabric is free from fiber clusters, oriented transverse to the fabric plane, of the type illustrated by FIGURE 21 of a conventional needlepunched felt. Properties of Fabric A and B are given below.

| | A | B |
|---|---|---|
| Weight (oz./yd.²) | 2.7 | 2.2 |
| Strip Tensile Strength (lbs./in.)/(oz./yd.²): | | |
| MD | 2.6 | 3.8 |
| XD | 2.8 | 3.1 |
| 5% Secant Modulus (lbs./in.)/(oz./yd.²): | | |
| MD | 2.8 | 6.0 |
| XD | 2.8 | 3.3 |
| Elongation at Break (percent): | | |
| MD | 53 | 52 |
| XD | 55 | 55 |
| Entanglement Completeness (c̄) | 0.5 | 0.7 |
| Entanglement Frequency (f) (per inch) | 31 | 40 |
| Fiber-Interlock Value | 14 | 17 |

Example XI

This example illustrates preparation of a smooth, dense, nonpatterned fabric, using stream oscillation.

The initial web is a random web prepared by airlaying (Rando-Webber) from a 50/50%, by weight, blend of 1.5 d.p.f., 1.5 inch polyester fiber and 1.5 d.p.f., 0.25 inch rayon.

Figure 20:
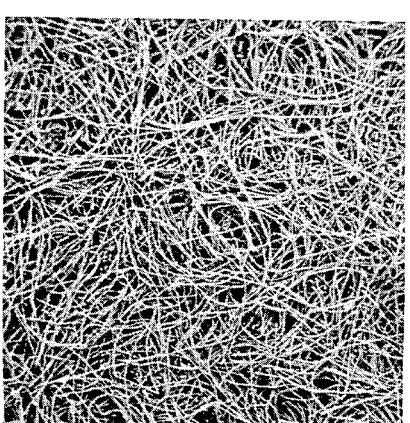

The orifice manifold has a line of 0.005-inch diameter orifices, 40 per inch and is of the type shown in FIGURE 9. The orifices are carefully cleaned and bored to get as sharp an entry into the orifice as possible to minimize any breaking up of the streams issuing from the orifice. During treatment the orifices are spaced about 1 inch above the web; the manifold is oscillated at 200 r.p.m. The web is kept between screens (100 x 100 wires/inch, 30% open area) during treatment to support and hold it in place. Treatment involves 6 passes at 4.6 yards per minute, using 1500 p.s.i.g. water at 60° C. The web is then removed, turned over, replaced between the screens, and given another 6 passes as above. A substantially nonpatterned fabric is obtained. As illustrated by FIGURE 20, a photomicrograph of the interior of the fabric made with a scanning electron microscope, there are substantially no clusters of fiber segments oriented transversely to the fabric plane. When the surface of th efabric is viewed, a slight jet-track-pattern, corresponding to the path of jet oscillation, is visible. Properties of the fabric are given below.

Weight (oz./yd.²) _____ 2.1
Strip tensile strength (lbs./in.)/(oz./yd.²):
    MD _____ 3.3
    XD _____ 4.1

5% secant modulus (lbs./in.)/(oz./yd.²):
  MD ........................................... 3.7
  XD ........................................... 4.3
Elongation at break (percent):
  MD ........................................... 58
  XD ........................................... 58
Entanglement completeness $\bar{c}$ .............. 0.5
Entanglement frequency $\bar{f}$ (per inch) ..... 55
Fiber-interlock value ........................... 19

Example XII

This example illustrates preparation of a substantially nonpatterned product from a layered web composite.

The product is made by treating a composite of three layers, the layers being added in two steps. In the final assembly, the center layer is a 1.3 oz./yd.² web of randomly-disposed continuous filaments of 3 denier per filament. It contains 88% of continuous filaments of polyethylene terephthalate (prepared so that they have a spontaneous elongation of about 12% upon heating at 200° C. or higher) and about 12% of continuous filaments, having a nominal denier of 3 d.p.f., of a copolymer of ethylene terephthalate and ethylene isophthalate units (80/20 weight percent). The latter fibers can be fused at lower temperature than the former to provide binder. The random web is prepared by the process of British Patent No. 932,482, granted Nov. 20, 1963, and the homopolymer fibers are processed according to Kitson et al. U.S. Patent No. 2,952,879, issued Sept. 20, 1960, to provide the potential spontaneous elongation. Each outer layer is a 0.6 oz./yd.² web of randomly-disposed (Rando-Webber) staple fibers of a polyester, the fibers having a denier per filament of 1.8 and a length of ⅜ to ⅝ inch. The polyester staple is a type having approximately 55% latent shrinkage. The weighted mean denier of the composite is 2.4 d.p.f.

The manifold used in the treatment has a single line of 0.005-inch diameter orifices spaced 40 per inch, and is of the type shown in FIGURE 9. The orifices are carefully cleaned and bored to get as sharp an entry into the orifices as possible to minimize any breaking up of the streams issuing from the orifices.

Preparation involves placing the continuous filament web on a support screen (30 x 30 wires/inch, 30% open area); covering the web with a 0.6 oz./yd.² staple web; and covering the staple web with a top screen (13 x 18 wires/inch, 75% open area). The assembly is then passed under essentially columnar streams of 60° C. water issuing from the orifices, the assembly being spaced approximately one inch from the orifices, and being passed at a speed of 7 yards per minute. Treatment involves one pass at 500 p.s.i.g. with the top screen; removal of the top screen; one pass at 1000 p.s.i.g.; and finally one pass at 1500 p.s.i.g. The sample is then removed from the support screen, turned over, placed on a finer mesh support screen (100 x 100 wires/inch, 25% open area), and covered with a 0.6 oz./yd.² staple web (this staple web is on that face of the continuous filament web which was not previously overlaid with staple). A top screen (13 x 18 wires/inch, 75% open area) is placed on the last laid web; and the assembly is passed under the streams using the same process and pressures as above but using a speed of 5 yards per minute. The product thus obtained is a smooth, dense, substantially nonpatterned nonwoven fabric, which has an entanglement completeness $\bar{c}$ of 1 and an entanglement frequency $\bar{f}$ of 30.

The continuous filament web is prepared from fibers, a portion of which can be bonded by suitable heat treatment. After preparation of the entangled nonwoven fabric, fusion-bonding is accomplished by passing the web, held between support screens, at 25 p.s.i. through a hot-air (235° C.) bonding device (Flow-Through Bonder) at 3 yards per minute. This provides additional anchoring of the surface fibers of the fabric.

Properties of the final bonded fabric are as follows:

Weight (oz./yd.²) .............................. 2.6
Strip tensile strength (lbs./in.)/(oz./yd.²):
  MD ........................................... 8.2
  XD ........................................... 7.4

Microscopic visual inspection of interior slices of the product show substantially no clusters of fibers, oriented transversely to the plane of the fabric, such as are found in heavyweight needle-punched fabrics. This can also be observed in photomicrographs taken with a scanning electron microscope. Photomicrographs taken by light transmitted through the fabric show the substantially nonpatterned nature of the fabric. The product is a strong, dense, lightweight nonwoven fabric, suitable for uses such as pockets in clothing.

Example XIII

This example illustrates preparation of a substantially nonpatterned, nonwoven fabric of heavy basis weight.

The initial material is a composite of three layers, each outer layer being a 3 oz./yd.² web of 70% rayon (¼ inch, 1.5 d.p.f.) and 30% kraft wood pulp, prepared by papermaking technique. The center layer is a 4 oz./yd.² unbonded, random web containing 88% of continuous filaments of polyethylene terephthalate having a nominal denier of 3 d.p.f. (prepared so that they have a spontaneous elongation of about 12% upon heating at 200° C. or higher) and about 12% of continuous filaments of nominal denier of 3 d.p.f. of a copolymer of ethylene terephthalate and ethylene isophthalate units (80/20 weight percent). The random web is prepared by the process of British Patent No. 932,482, granted Nov. 20, 1963, and the homopolymer fibers are processed according to Kitson et al. U.S. Patent No. 2,952,879, issued Sept. 20, 1960, to provide the potential self-elongation. The weighted mean denier of the staple/continuous filament/staple web composite is 2.1 d.p.f.

The manifold used contains a single line of 0.005-inch diameter orifices spaced 40/inch and is of the type shown in FIGURE 9. The orifices are carefully cleaned and bored to get as sharp an entry into the orifice as possible to minimize any breaking up of the streams issuing from the orifice.

Processing involves placing two of the layers (center layer and one outer layer) between two screens, each 100 x 100 wires/inch, 30% open area. These screens serve to hold the layers in place. The layers are treated from the outer-layer side, removed from between the screens, turned over, the second outer layer is added and the composite is treated from the other side. Treatment on each side includes two passes under the streams of 60° C. water issuing from the orifices, the manifold being oscillated at 200 r.p.m. and being spaced approximately one inch from the upper-web surface, and the water pressure being 1500 p.s.i.g. After this treatment the composite is heated at about 150° C. between flat plates, which are shimmed by 0.020-inch spacers. This treatment is not a bonding step; it merely serves to increase the density.

The product obtained is smooth, dense, and has a nonpatterned appearance. Microscopic visual examination of interior slices of the nonwoven fabric shows that there are substantially no clusters of fiber segments transverse to the plane of the fabric; this is also seen in photomicrographs taken with a scanning electron microscope. The basis weight of the final fabric is 8.5 oz./yd.². Strip tensile strength is 3.1 (lbs./in.)/(oz./yd.²). Entanglement completeness $\bar{c}$ is 0.56, entanglement frequency $\bar{f}$ is 28 per inch, and the fiber-interlock value is 21.

The nonwoven fabric is smooth, dense and strong and is particularly suitable for use in preparing leather replacement materials for shoes, luggage, etc.

TESTS FOR EVALUATING PHYSICAL PROPERTIES

In the foregoing examples, the tensile properties are measured on an Instron tester at 70° F. and 65% relative humidity. Strip tensile strength is determined for a sample 0.5-inch wide, using a 2-inch sample length and elongating at 50% per minute. Initial modulus is determined by measuring the initial slope of the stress-strain curve. The 5% secant modulus is defined by American Society for Testing and Materials Standards E6-61, part 10, page 1836. It is determined by reading, from the stress-strain curve used to measure strip tensile strength, the stress at 5% elongation and multiplying this by 20. Bending length is determined by using a sample 1 inch wide and 6 inches long and moving it slowly in a direction parallel to its long dimension so that its end projects from the edge of a horizontal surface. The length of the overhang is measured when the tip of the sample is depressed under its own weight to the point where the line joining the tip to the edge of the platform makes an angle of 41.5° with the horizontal. One-half of this length is the bending length of the specimen, reported in centimeters. Surface stability is determined by washing the samples 25 cycles in an automatic washer-dryer machine at cotton settings. The samples are then rated subjectively for surface stability on a scale of 5 (surface stability unaltered by the washing treatment) to 1 (sample falling apart or showing extremely bad pilling).

ENTANGLEMENT COMPLETENESS AND ENTANGLEMENT FREQUENCY TESTS

The nonwoven fabrics of this invention can be characterized as to the extent of fiber-entanglement by determining the entanglement completeness $\bar{c}$ and entanglement frequency $\bar{f}$ of the fabric. Both values are determined for the nonwoven fabrics in the "bond-free state" using an "Instron" tester and a special tensile-breaking test method. By "bond-free state" is meant that the test is run on nonwoven fabrics wherein the fibers are not adhered with binder or inter-fiber fusion bonds. In other words, the reported values must be those which result solely from fiber interentanglement.

Entanglement completeness $\bar{c}$ is a measure of the proportion of fibers that break (rather than slip out) when a long and wide strip is tested. It is related to the development of fabric strength.

Entanglement frequency $\bar{f}$ is a measure of the frequency of occurrence of entanglement sites along individual lengths of fiber in the nonwoven fabric. The higher the value of entanglement frequency the greater is the surface stability of the fabric, i.e., the resistance of the fabric to the development of pilling and fuzzing upon repeated laundering.

Durable nonwoven fabrics have an entanglement completeness $\bar{c}$ of at least 0.5. Nonwoven fabrics having satisfactory surface stability for conventional textile use, e.g., as apparel fabric, have an entanglement frequency $\bar{f}$ of at least 20 per inch, preferably at least 40 per inch. For textile uses not requiring retention of good surface appearance after repeated laundering, products having an entanglement completeness $\bar{c}$ of at least 0.5 and entanglement frequency $\bar{f}$ of less than 20 may be used.

Entanglement completeness $\bar{c}$ and frequency $\bar{f}$ are calculated from strip tensile breaking data, using strips of the following sizes:

| Strip Width Symbol | Strip Width (in.) | "Instron" Gauge Length (in.) | Elongation Rate (in./min.) |
|---|---|---|---|
| $w_0$ | 0.8 | 0 | 0.5 |
| $w_1$ | 0.3 | 1.5 | 5 |
| $w_2$ | $2w_0+w_1<2.0$ in. | 1.5 | 5 |

In cutting the strips from fabrics having a repeating pattern, e.g., a pattern of ridges or lines of high and low basis weight, integral numbers of repeating units are included in the strip width, always cutting through the low basis weight portion and attempting in each case to approximate the desired widths for $w_0$ and $w_1$ closely. However, in order to have $w_2$ less than 2.0 inches, $w_0$ can be reduced slightly. The width of the narrowest part of a $w_1$ strip is critical. It must not deviate from the average width for all $w_1$ strips by more than ±0.02 inch.

For patterned fabrics, strips are cut in two directions: (a) in the direction of pattern ridges or lines of highest basis weight (i.e., weight per unit area), and (b) in the direction at 90° to the direction specified in (a). In unpatterned fabrics, any two directions at 90° will suffice.

In each chosen fabric direction, 10 or more strips are cut for testing at $w_1$, 5 or more at $w_2$, and 5 or more at $w_0$. In order to minimize the effect of local weak spots, if present in the fabric, all strips of any one size should not be cut from consecutively adjacent areas along the fabric. Thus, it is preferred, if all strips are being cut from a small section of the fabric, to alternate the strips as follows: $w_1$, $w_2$, $w_1$, $w_0$, and so on.

Each strip is tested to determine tensile breaking force, using an "Instron" tester with standard rubber-coated flat jaw faces and the gauge lengths and elongation rates listed above. For a given sample, the whole test should be carried out within a few hours, from strip cutting to tensile testing.

Average tensile breaking forces for each width ($w_0$, $w_1$, and $w_2$) for each direction are correspondingly reported as $T_0$, $T_1$ and $T_2$, using three significant figures. It is observed that for each direction:

$$\frac{T_1}{w_1} \leq \frac{T_2}{w_2} \leq \frac{T_0}{w_0}$$

It is postulated that the above inequalities occur because:

(1) There is a border zone of width D at the cut edges of the long gauge length specimens, which zone is ineffective in carrying stress, and (2) With zero gauge length, fibers are clamped jaw-to-jaw and ideally all fibers carry stress up to the breaking point, while with long gauge length, some poorly entangled fibers slip out without breaking.

A measure of the proportion of stress-carrying fibers for the fabric direction tested is calculated from the formulas below and is designated $c$.

Provided that D is less than $\frac{1}{2}w_1$, then:

$$\frac{T_1}{w_1-2D} = \frac{T_2}{w_2-2D} = c\frac{T_0}{w_0}$$

and:

$$D = \frac{w_1 T_2 - w_2 T_1}{2(T_2 - T_1)}$$

and:

$$c = \frac{w_0(T_2 - T_1)}{T_0(w_2 + w_1)}$$

In certain cases, D may be nearly zero and even a small experimental error can result in the measured D being negative.

The values $c$ and D are determined separately for each fabric direction and the arithmetic means of the values for both directions, $\bar{c}$ and $\bar{D}$ are calculated.

The value $\bar{c}$ is reported as the entanglement completeness of the fabric. When $\bar{c}$ is greater than 0.5, $\bar{D}$ is a measure of the average distance required for fibers in the fabric to become completely entangled so that they cannot be separated without breaking. When $\bar{c}$ is less than 0.5, it has been found that $\bar{D}$ may be influenced by factors other than entanglement. Accordingly, when $\bar{c}$ is less than 0.5, calculation of $\bar{D}$ as described above may not be meaningful.

From testing various samples, it is observed that the surface stability of a fabric increases with increasing product of ($1/\overline{D}$) and the square root of fiber denier $d$. Since 1.5 denier fibers are frequently used, all deniers are normalized with respect to 1.5 and entanglement frequency $\bar{f}$ per inch is defined as:

$$\bar{f} = (1/\overline{D})\sqrt{d/1.5}$$

If the fabric contains fibers of more than one denier, the weighted average of the deniers is used for $d$. If the measured $\overline{D}$ turns out to be zero or negative, it is proper to assume that the actual $\overline{D}$ is less than 0.01 inch and $\bar{f}$ is therefore greater than $100\sqrt{d/1.5}$ per inch.

FIBER-INTERLOCK TEST

The fiber-interlock value is the maximum force in grams per unit fabric weight needed to pull apart a given sample between the two hooks.

Samples are cut 0.5 inch x 1.0 inch and weighed, and each sample is marked with two points 0.5 inch apart symmetrically along the midline of the fabric so that each point is 0.25 inch from the sides near an end of the fabric.

The eye end of a hook (Carlisle-6 fish hook with the barb ground off or a hook of similar wire diameter and size) is mounted on the upper jaw of an Instron tester so that the hook hangs vertically from the jaw. This hook is inserted through one marked point on the fabric sample.

A second hook is inserted through the other marked point on the sample, and the eye end of the hook is clamped in the lower jaw of the Instron. The two hooks are now opposed but in line, and hold the sample at 0.5-inch interhook distances.

The "Instron" tester is set to elongate the sample at 0.5 inch per minute (100% elongation/minute) and the force in grams to pull the sample apart is recorded. The maximum load in grams divided by the fabric weight in grams per square meter is the single fiber interlock value. The average of 3 determinations in the machine direction and 3 in the cross direction (or of samples cut in directions at 90° to each other) is reported to two significant figures as the fiber interlock value.

EXAMINATION FOR CLUSTERS OF TRANSVERSE FIBER SEGMENTS

Fiber structures such as those of heavy needle-punched felts are characterized by clusters of fiber segments oriented transversely to the plane of the felt. The presence or absence of such clusters can be observed in a microsection taken through the interior parallel to the plane of a sample. For quantitative evaluation a photomicrograph is needed. One way to do this is to embed a sample in epoxy resin containing a blue pigment, cut 30-micron sections parallel to the plane of the fabric with a microtome, and mount a representative center microsection between two glass slides in an oil having the same refractive index as the epoxy resin. The microsection can be photographed with white light or with an orange filter so that transverse fiber segments show up as white dots. A magnification of at least 50× is needed to avoid mistaking several adjacent transverse fiber segments for one single fiber segment, and to avoid mistaking crossings of planar fibers for transverse fiber segments.

The above method is not satisfactory for crimped fibers, since transversity due to crimp largely masks transversity due to needling. These can best be distinguished in a photomicrograph prepared with a scanning electron microscope. A specimen is embedded in ice, microsections are cut parallel to the plane of the fabric with a microtome until the interior is exposed about halfway through the specimen, then the ice is melted and the specimen dried. The interior cut surface is metallized and photographed with a scanning electron microscope. FIGURES 18–20 illustrate photomicrographs prepared in this manner.

The positions of all transverse fiber sections are marked on the photomicrograph. The average area per fiber is calculated by dividing the total area (A) on the photo by the number (N) of transverse fiber segments. A circle with the same area as the average area per fiber would have a radius of:

$$r = \sqrt{A/\pi N}$$

Circles of this radius are drawn around all transverse fiber locations. The total area (A′) inside these circles is measured, counting any overlapping areas of two circles but once. If transverse fibers are uniformly spaced, there is little overlap, and because of the definition of (r), (A′) is almost equal to (A). If fiber segments are clustered as in FIGURE 21, there is much overlap, and consequently (A′) is considerably smaller than (A). The clustering coefficient is defined as the ratio of A/A′. Some clustering coefficient values determined at about 60× are given below:

Product of Example X–B (FIG. 19) _____ 2.2
19 oz./yd.² commercial needle-punched felt (FIG. 21) _____ 3.8
Product of Example XI (FIG. 20) _____ 2.2
Product of Example XII _____ 1.9

Since many different embodiments of the invention may be made without departing from the spirit and scope thereof, it is to be understood that the invention is not limited by the specific illustrations except to the extent defined in the following claims.

We claim:
1. A nonpatterned, nonwoven textile fabric weighing less than 8 ounces per square yard, the fabric having a substantially uniformly dense structure of interentangled fibrous material selected from the group consisting of cellulosic and synthetic textile fibers, fiber segments oriented transversely to the plane of the fabric being randomly distributed as opposed to clustered, the fibers of the fabric being locked into place by a three-dimensional fiber entanglement characterized by a fiber entanglement completeness ($\bar{c}$) of at least 0.5 and an entanglement frequency ($\bar{f}$) of at least 25 per inch when measured in the bond-free condition, the fiber interlock value being at least 10, and wherein the individual fibers of the structure are intertwined, tangled, and interlaced with each other so as to be virtually inseparable.

2. A nonwoven fabric as defined in claim 1 weighing up to 2.7 ounces per square yard.

References Cited

UNITED STATES PATENTS

| | | | |
|---|---|---|---|
| 2,774,129 | 12/1956 | Secrist | 161—169 X |
| 2,862,251 | 12/1958 | Kalwaites | 161—169 X |
| 2,881,505 | 4/1959 | Hoffman | 28—72.2 |
| 2,893,105 | 7/1959 | Lauterbach | 28—72.2 |
| 2,958,113 | 11/1960 | Lauterbach | 28—79 |
| 3,033,721 | 5/1962 | Kalwaites | 161—109 X |
| 3,214,819 | 11/1965 | Guerin | 28—72.2 |

ROBERT F. BURNETT, Primary Examiner

ROGER L. MAY, Assistant Examiner

U.S. Cl. X.R.

19—161; 28—1, 76; 162—115, 204

Dedication 3,493,462.—*William Wallar Bunting, Jr., Franklin James Evans* and *David Ellis Hook*, Wilmington, Del. NONPATTERNED, NONWOVEN, FABRIC. Patent dated Feb. 3, 1970. Dedication filed Mar. 29, 1976, by the assignee, *E. I. du Pont de Nemours and Company*.

Hereby dedicates to the Public the entire remaining term of said patent.

[*Official Gazette May 25, 1976.*]